United States Patent
Masuda et al.

(10) Patent No.: US 12,119,506 B2
(45) Date of Patent: Oct. 15, 2024

(54) LITHIUM-ION BATTERY DEVICE FOR VEHICLE

(71) Applicant: MAZDA MOTOR CORPORATION, Hiroshima (JP)

(72) Inventors: Wataru Masuda, Aki-gun (JP); Teruhiko Hanaoka, Aki-gun (JP); Toshiki Takahashi, Aki-gun (JP); Chikara Kawamura, Aki-gun (JP); Masanori Honda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 290 days.

(21) Appl. No.: 17/024,334

(22) Filed: Sep. 17, 2020

(65) Prior Publication Data

US 2021/0202924 A1 Jul. 1, 2021

(30) Foreign Application Priority Data

Dec. 27, 2019 (JP) .................. 2019-237781

(51) Int. Cl.
*H01M 10/0525* (2010.01)
*H01M 50/20* (2021.01)
(Continued)

(52) U.S. Cl.
CPC ....... *H01M 50/20* (2021.01); *H01M 10/0525* (2013.01); *H01M 50/531* (2021.01);
(Continued)

(58) Field of Classification Search
CPC ............ H01M 50/20; H01M 10/0525; H01M 2220/20; H01M 50/103; H01M 50/176;
(Continued)

(56) References Cited

U.S. PATENT DOCUMENTS

2015/0303411 A1* 10/2015 Seong .................. H01M 50/103
429/163
2016/0141564 A1* 5/2016 Han .................... H01M 50/147
429/94
(Continued)

FOREIGN PATENT DOCUMENTS

CN 106233521 A 12/2016
DE 112015001916 T5 1/2017
(Continued)

OTHER PUBLICATIONS

Kobayashi et al., JP-2012230837 Machine Translation (Year: 2012).*

*Primary Examiner* — Ula C Ruddock
*Assistant Examiner* — Anna Korovina
(74) *Attorney, Agent, or Firm* — Studebaker & Brackett PC

(57) ABSTRACT

A lithium-ion battery device comprises a housing, a battery cell stored inside the housing, and an adjacent member provided adjacently to and on a rearward side, in a vehicle longitudinal direction, of the battery cell. The battery cell comprises a cell case, an electrode body stored inside the cell case, and a pair of terminals. The cell case includes a first main face and a second main face which face to each other in the vehicle longitudinal direction. At least two gap-forming portions which respectively have a smaller area than the second main face and have a specified thickness of the vehicle longitudinal direction are arranged between the second main face and the adjacent member. The two gap-forming portions are provided to be spaced apart from each other in an inter-terminal direction of the battery cell.

4 Claims, 15 Drawing Sheets

(51) Int. Cl.
*H01M 50/531* (2021.01)
*H01M 50/543* (2021.01)
*H01M 50/547* (2021.01)

(52) U.S. Cl.
CPC ....... *H01M 50/543* (2021.01); *H01M 50/547* (2021.01); *H01M 2220/20* (2013.01)

(58) Field of Classification Search
CPC ............ H01M 50/259; H01M 50/209; H01M 50/289; H01M 50/291; H01M 10/617; H01M 10/647; H01M 10/6555
See application file for complete search history.

(56) References Cited

U.S. PATENT DOCUMENTS

| | | | |
|---|---|---|---|
| 2016/0190634 A1* | 6/2016 | Takahata | H01M 10/0481 429/94 |
| 2017/0033339 A1 | 2/2017 | Watanabe et al. | |
| 2017/0047616 A1* | 2/2017 | Takahata | H01M 10/0431 |
| 2017/0288425 A1* | 10/2017 | Fukushima | H01M 50/20 |
| 2019/0013500 A1 | 1/2019 | Sakurai | |
| 2019/0221825 A1* | 7/2019 | Lee | H01M 10/0525 |

FOREIGN PATENT DOCUMENTS

| | | | |
|---|---|---|---|
| JP | 2002-190288 A | | 7/2002 |
| JP | 2012230837 A | * | 11/2012 |
| JP | 2017117633 | * | 6/2017 |
| JP | 2017117633 A | * | 6/2017 |
| KR | 20150124215 A | | 11/2015 |
| WO | 2011/012198 A1 | | 2/2011 |

\* cited by examiner

LITHIUM-ION BATTERY DEVICE FOR VEHICLE

BACKGROUND OF THE INVENTION

The present invention relates to a lithium-ion battery device for a vehicle.

The lithium-ion battery is a secondary battery which performs charging/discharging by transferring lithium ion between a positive electrode and a negative electrode, which has features of having the high energy density, the high charging/discharging efficiency, and the like. This lithium-ion battery is widely used as a power source for vehicles, especially an electric automotive vehicle or a hybrid automotive vehicle.

However, the lithium-ion battery may require some measures for improving the safety because a combustible organic solvent is used as an electrolyte. Particularly, it is necessary to take sufficient measures for the lithium-ion battery installed at the vehicle so that the battery may not be easily broken even in a vehicle collision. Accordingly, the recent vehicles take measures of using a battery housing having a strong structure or the like so as to secure the improved safety.

Japanese Patent Laid-Open Publication No. 2002-190288 proposes a structure in which the temperature of the battery is suppressed from becoming excessively high. Specifically, a battery device disclosed in this patent document comprises plural flat-plate shaped battery cells which stand in a line in a thickness direction (referred to as a battery module in this document) and a housing (a lower case and a battery cover) which stores the battery cells. An air-intake duct through which air supplied from an air-supply fan is introduced and an air-exhaust duct through which the air is exhausted are coupled to the housing. The battery cells are fixed inside the housing such that these battery cells are spaced apart from each other. The air introduced into the housing from the air-supply fan passes through a gap between the adjacent battery cells, and then is exhausted from the housing. This air flowing inside the housing cools the battery cells, so that the temperature of the battery cells are suppressed from becoming excessively high. Accordingly, the safety of the battery device is improved.

The inventors of the present invention and others have analyzed a phenomenon which occurs in a case where a load is inputted to the battery cells for the purpose of further improving the safety of the lithium-ion battery device. The phenomenon which may be concerned when the load is inputted to the battery cells is that an electrode body inside each cell is so damaged that a short circuit is improperly caused. Accordingly, the analysis has been conducted from a point of view of suppressing such damage of the electrode body (short circuit). As a result, it has been found that even if the load which is strong enough to deform a cell case which forms a contour of the battery cell is inputted, the electrode body inside the cell case may not be damaged uniformly, in other words, it may be possible to deform the cell case, protecting the electrode body from the damage. For example, in a case where the cell case is so crushed that the thickness of the cell case is greatly reduced, it may be easily occur that the electrode body is damaged. Meanwhile, even if the cell case is deformed, in a case where this deformation happens in such a manner that the thickness of the cell case is substantially maintained, the damage of the electrode body may not be so easily caused.

In this regard, there is room for improvement in the battery device disclosed in the above-described patent document. That is, since the plural battery cells disclosed in the patent document merely stand in a line in the thickness direction such that these are spaced apart from each other, in a case where the load is inputted to the battery cell positioned at a one-end side, this battery cell which have received the inputted load comes to be pushed against the adjacent battery cell and then crushed. Thus, there is a concern that the thickness of the cell case may be reduced greatly. This great thickness-reduction (crushing of the cell case) may cause the damage of the electrode body and the occurrence of the short circuit.

SUMMARY OF THE INVENTION

The present invention has been devised in view of the above-described matter, and an object of the present invention is to provide a lithium-ion battery device for a vehicle which can suppress the damage of the electrode body in the case where the load is inputted to the battery cell.

A first aspect of the present invention is a lithium-ion battery device for a vehicle, comprising a housing, a battery cell stored inside the housing, and an adjacent member provided adjacently to and on a rearward side, in a vehicle longitudinal direction, of the battery cell, wherein the battery cell comprises a cell case, an electrode body stored inside the cell case, and a pair of terminals provided at a face of the cell case, the cell case includes a first main face and a second main face which respectively have a larger area than the face at which the pair of terminals are provided and face to each other in the vehicle longitudinal direction, the second main face is arranged on the rearward side, in the vehicle longitudinal direction, of the first main face, at least two gap-forming portions which respectively have a smaller area than the second main face and have a specified thickness of the vehicle longitudinal direction are arranged between the second main face and the adjacent member, and the at least two gap-forming portions are provided to be spaced apart from each other in an inter-terminal direction of the battery cell.

According to this first aspect of the present invention, since the two gap-forming portions provided to be spaced apart from each other in the inter-terminal direction are arranged between the second main face arranged on the rearward side in the vehicle longitudinal direction and the adjacent member provided adjacently to the second main face, a space formed between the both gap-forming portions can be used as a space to allow bending deformation of the cell case. For example, in a vehicle frontal collision, a collision load is inputted from a vehicle forward side to the first main face of the cell case positioned on the vehicle forward side, so that there occurs a bending moment to bend the cell case rearwardly about the two gap-forming portions serving as a fulcrum. This bending moment acts such that the cell case is deformed in an arched shape and a middle portion of the cell case which is located between the two gap-forming portions is displaced rearwardly. Herein, the space formed between the two gap-forming portions performs as the space to allow bending deformation of the middle portion of the cell case, thereby promoting the bending deformation of the cell case. Then, since the collision energy is absorbed sufficiently by the bending deformation of the cell case, it is suppressed that the cell case is deformed such that it is crushed greatly in the thickness direction. Thereby, it can be suppressed that there occur the damage of the electrode body inside the cell case and the short circuit caused by this damage. That is, according to the present invention, by a relatively simple way that the plural gap-forming portions are arranged between the rearward-side face (second main face) of the cell case and the adjacent member provided adjacently to this face, the deformation of the cell case can be controlled such that the thickness of the cell case is not reduced (crushed) greatly, so that it can be effectively suppressed that there occur the damage of the electrode body inside the cell case and the short circuit caused by this damage.

In an embodiment of the first aspect of the present invention, the first main face of the cell case has a concave groove which is positioned between the two gap-forming portions and extends in a direction perpendicular to the inter-terminal direction of the battery cell.

According to this embodiment, the concave groove formed at the first main face can be made to function as a starting point of the above-described bending deformation of the cell case. Thereby, the controllability of the deformation of the cell case is so improved that the possibility of the crush of the cell case (thickness's great reduction) can be reduced, thereby effectively suppressing the damage (short circuit) of the electrode body inside the cell case.

In another embodiment of the first aspect of the present invention, the battery cell further comprises a pair of collectors connecting the electrode body and the pair of terminals inside the cell case, and the two gap-forming portions are positioned such that the two gap-forming portions do not overlap with the pair of collectors in a vehicle-longitudinal-direction view.

According to this embodiment, a situation where the collectors and the cell case contact each other when the load is inputted from the vehicle forward side can be avoided. That is, when the load is inputted from the vehicle forward side, there is a concern that the second main face of the cell case may be partially deformed by receiving a reaction force from the gap-forming portions. According to this embodiment, however, since the gap-forming portions are positioned such that these portions do not overlap with the collectors in the vehicle-longitudinal-direction view, it is avoided that the distance between the second main face and the collectors is reduced greatly even if the reaction force from the gap-forming portions have caused the second main face of the cell case to be partially deformed toward the first main face. Thereby, contacting of the cell case and the collectors and the short circuit caused by this contacting can be suppressed.

In another embodiment of the first aspect of the present invention, the lithium-ion battery device for the vehicle further comprises an additional battery cell provided on the rearward side, in the vehicle longitudinal direction, of the battery cell, and an additional adjacent member provided adjacently to and on the rearward side, in the vehicle longitudinal direction, of the additional battery cell, wherein an additional gap-forming portion which has a smaller thickness of the vehicle longitudinal direction than the two gap-forming portions is provided between the additional battery cell and the additional adjacent member.

Herein, when the load is inputted to the plural battery cells standing in a line in the vehicle longitudinal direction from the vehicle forward side, the foremost battery cell tends to be deformed the most, and the amount of deformation which the other battery cell positioned on the vehicle rearward side of this battery cell has becomes gradually less. That is, the collision energy is absorbed by the foremost battery cell so sufficiently (greatly) that the rearward-side battery cell (additional battery cell) comes to receive less influence of the collision load, so that the amount of deformation of the battery cell positioned on the vehicle rearward side becomes less. Therefore, according to this embodiment, since the thickness of the additional gap-forming portion which is positioned on the rearward side of the additional battery cell is set to be small, the battery device can be suppressed from becoming improperly large-sized, obtaining the above-described damage-suppression effect of the electrode body.

A second aspect of the present invention is a lithium-ion battery device for a vehicle, comprising a housing, a battery cell stored inside the housing, and an adjacent member provided adjacently to and on a forward side, in a vehicle longitudinal direction, of the battery cell, wherein the battery cell comprises a cell case, an electrode body stored inside the cell case, and a pair of terminals provided at a face of the cell case, the cell case includes a first main face and a second main face which respectively have a larger area than the face at which the pair of terminals are provided and face to each other in the vehicle longitudinal direction, the second main face is arranged on the forward side, in the vehicle longitudinal direction, of the first main face, at least two gap-forming portions which respectively have a smaller area than the second main face and have a specified thickness of the vehicle longitudinal direction are arranged between the second main face and the adjacent member, and the at least two gap-forming portions are provided to be spaced apart from each other in an inter-terminal direction of the battery cell.

According to this second aspect of the present invention, the strength against the load inputted from the vehicle rearward side, e.g., a collision load inputted from the vehicle rearward side in a vehicle rear collision, can be improved. That is, since the two gap-forming portions provided to be spaced apart from each other in the inter-terminal direction are arranged between the second main face arranged on the forward side in the vehicle longitudinal direction and the adjacent member provided adjacently to the second main face, when the load inputted from the vehicle rearward side is applied to the first main face of the cell case positioned on the vehicle rearward side, the deformation of this cell case can be controlled such that the thickness of the cell case is not reduced greatly, like the above-described battery device of the first aspect of the present invention, so that the damage of the electrode body inside the cell case (short circuit) can be suppressed.

In an embodiment of the second aspect of the present invention, the first main face of the cell case has a concave groove which is positioned between the two gap-forming portions and extends in a direction perpendicular to the inter-terminal direction of the battery cell.

According to this embodiment, the above-described of the deformation controllability can be further improved by utilizing the concave groove as the starting point of the deformation.

In another embodiment of the second aspect of the present invention, the battery cell further comprises a pair of collectors connecting the electrode body and the pair of terminals inside the cell case, and the two gap-forming portions are positioned such that the two gap-forming portions do not overlap with the pair of collectors in a vehicle-longitudinal-direction view.

According to this embodiment, a situation where the collectors and the cell case contact each other when the load is inputted from the vehicle rearward side can be avoided.

In another embodiment of the second aspect of the present invention, the lithium-ion battery device for the vehicle further comprises an additional battery cell provided on the forward side, in the vehicle longitudinal direction, of the battery cell, and an additional adjacent member provided adjacently to and on the rearward side, in the vehicle longitudinal direction, of the additional battery cell, wherein an additional gap-forming portion which has a smaller thickness of the vehicle longitudinal direction than the two gap-forming portions is provided between the additional battery cell and the additional adjacent member.

According to this embodiment, the battery device can be suppressed from becoming improperly large-sized, obtaining the above-described damage-suppression effect of the electrode body when the load is inputted from the vehicle rearward side.

A third aspect of the present invention is a lithium-ion battery device for a vehicle, comprising a housing, a battery cell stored inside the housing, and an adjacent member provided adjacently to and on an inward side, in a vehicle width direction, of the battery cell, wherein the battery cell comprises a cell case, an electrode body stored inside the cell case, and a pair of terminals provided at a face of the cell case, the cell case includes a first main face and a second main face which respectively have a larger area than the face at which the pair of terminals are provided and face to each other in the vehicle width direction, the second main face is arranged on the inward side, in the vehicle width direction, of the first main face, at least two gap-forming portions which respectively have a smaller area than the second main face and have a specified thickness of the vehicle width direction are arranged between the second main face and the adjacent member, and the at least two gap-forming portions are provided to be spaced apart from each other in an inter-terminal direction of the battery cell.

According to this third aspect of the present invention, the strength against the load inputted from the vehicle outward side, e.g., a collision load inputted from the vehicle outward side in a vehicle side collision, can be improved. That is, since the two gap-forming portions provided to be spaced apart from each other in the inter-terminal direction are arranged between the second main face arranged on the inward side in the vehicle width direction and the adjacent member provided adjacently to the second main face, when the load inputted from the vehicle outward side is applied to the first main face of the cell case positioned on the vehicle outward side, the deformation of this cell case can be controlled such that the thickness of the cell case is not reduced greatly, like the above-described battery device of the first or second aspects of the present invention, so that the damage of the electrode body inside the cell case (short circuit) can be suppressed.

In an embodiment of the third aspect of the present invention, the first main face of the cell case has a concave groove which is positioned between the two gap-forming portions and extends in a direction perpendicular to the inter-terminal direction of the battery cell.

According to this embodiment, the above-described of the deformation controllability can be further improved by utilizing the concave groove as the starting point of the deformation.

In another embodiment of the third aspect of the present invention, the battery cell further comprises a pair of collectors connecting the electrode body and the pair of terminals inside the cell case, and the two gap-forming portions are positioned such that the two gap-forming portions do not overlap with the pair of collectors in a vehicle-width-direction view.

According to this embodiment, a situation where the collectors and the cell case contact each other when the load is inputted from the vehicle outward side can be avoided.

In another embodiment of the third aspect of the present invention, the lithium-ion battery device for the vehicle further comprises an additional battery cell provided on the forward side, in the vehicle longitudinal direction, of the battery cell, and an additional adjacent member provided adjacently to and on the inward side, in the vehicle width direction, of the additional battery cell, wherein an additional gap-forming portion which has a smaller thickness of the vehicle width direction than the two gap-forming portions is provided between the additional battery cell and the additional adjacent member.

According to this embodiment, the battery device can be suppressed from becoming improperly large-sized, obtaining the above-described damage-suppression effect of the electrode body when the load is inputted from the vehicle rearward side.

The present invention will become apparent from the following description which refers to the accompanying drawings.

BRIEF DESCRIPTION OF THE DRAWINGS

FIG. 11A showing a relationship between a rib distance and an electrode-body stress; FIG. 11B showing a relationship between a groove width and the electrode-body stress.

DETAILED DESCRIPTION OF THE INVENTION

(1) First Embodiment

[Schematic Structure of Vehicle]

Figure 1:
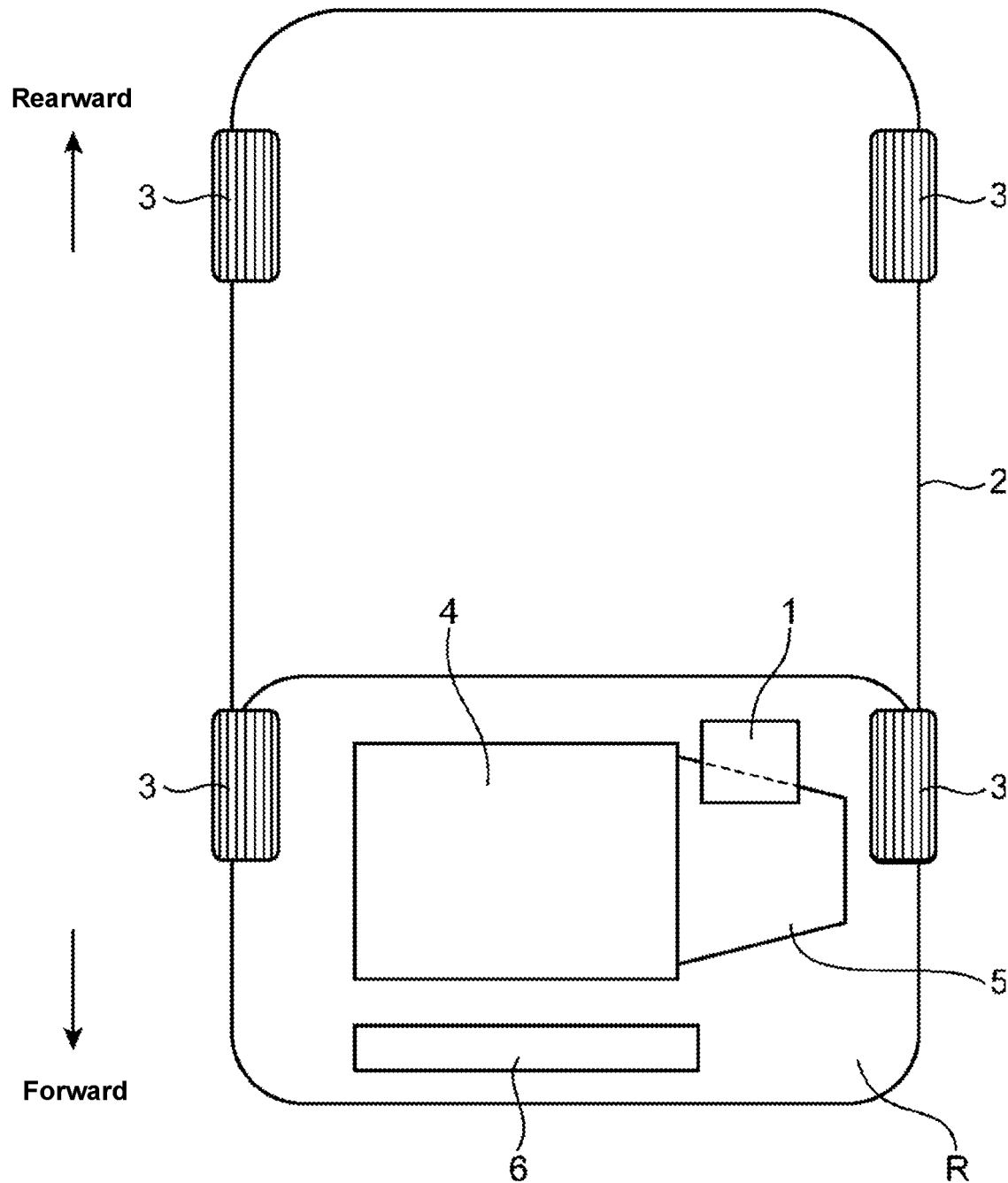
FIG. 1 is a diagram showing a schematic structure of a vehicle to which a lithium-ion battery device according to a first embodiment of the present invention is applied.

FIG. 1 is a diagram showing a schematic structure of a vehicle to which a lithium-ion battery device 1 according to a first embodiment of the present invention is applied. As shown in the figure, the vehicle is a four-wheel automotive vehicle where the lithium-ion battery device 1 (hereafter, referred to as the battery device 1 simply), which comprises a vehicle body 2, plural (four) wheels 3 to support the vehicle body 2, an engine 4, such as a four-cycle internal combustion engine installed as a power source to rotationally drive the wheels 3 (in other words, to drive the vehicle), a transmission 5 to transmit a rotational force of the engine 4, and a radiator 6 to cool coolant introduced into the engine 4 through heat-exchanging with external air.

The battery device 1 is a chargeable/dischargeable secondary battery. That is, the battery device 1 has the function of a power source to supply the power for operating various electric parts of the vehicle and also the function of a charger to charge the power generated by an electric generator, such as an alternator, attached to the engine 4.

The battery device 1, the engine 4, the transmission 5, and the radiator 6 are stored in an engine room R provided at a front portion of the vehicle body 2. The battery device 1 and the transmission 5 are close to each other such that the battery device 1 is positioned on an upper-rear side of the transmission 5. In other words, the battery device 1 is arranged such that its front portion is located right above of a rear portion of the transmission 5.

In the present specification, "forward" and "rearward" will be used as terms for describing directions. That is, an advancing side, in a vehicle's moving-forward direction, of the vehicle (a side directed toward an engine room R from a center of the vehicle body 2 in an example shown in FIG. 1) will be referred to as "forward," whereas an advancing side, in a vehicle's going-back direction, of the vehicle (a side directed toward the center of the vehicle body 2 from the engine room R in the example shown in FIG. 1) will be referred to as "rearward." Thus, since the directional terms of "forward" and "rearward" are based on the vehicle, the terms of "vehicle forward side" and "vehicle rearward side" will be used in the present specification as well. In some cases, however, simpler expressions of "forward side" and "rearward side" will be used by omitting the word of "vehicle." The meaning is the same.

Further, in the following, an expression of "vehicle width direction" means a direction perpendicular to a vehicle longitudinal direction in a plan view. A directional expression of "vertical direction" means a direction which is perpendicular both to the vehicle longitudinal direction and the vehicle width direction, and a side directed toward a top from a ground surface which the wheel 3 contacts is an "upward" side and its opposite side is a "downward" side.

[Detailed Structure of Battery Device]

Figure 2:
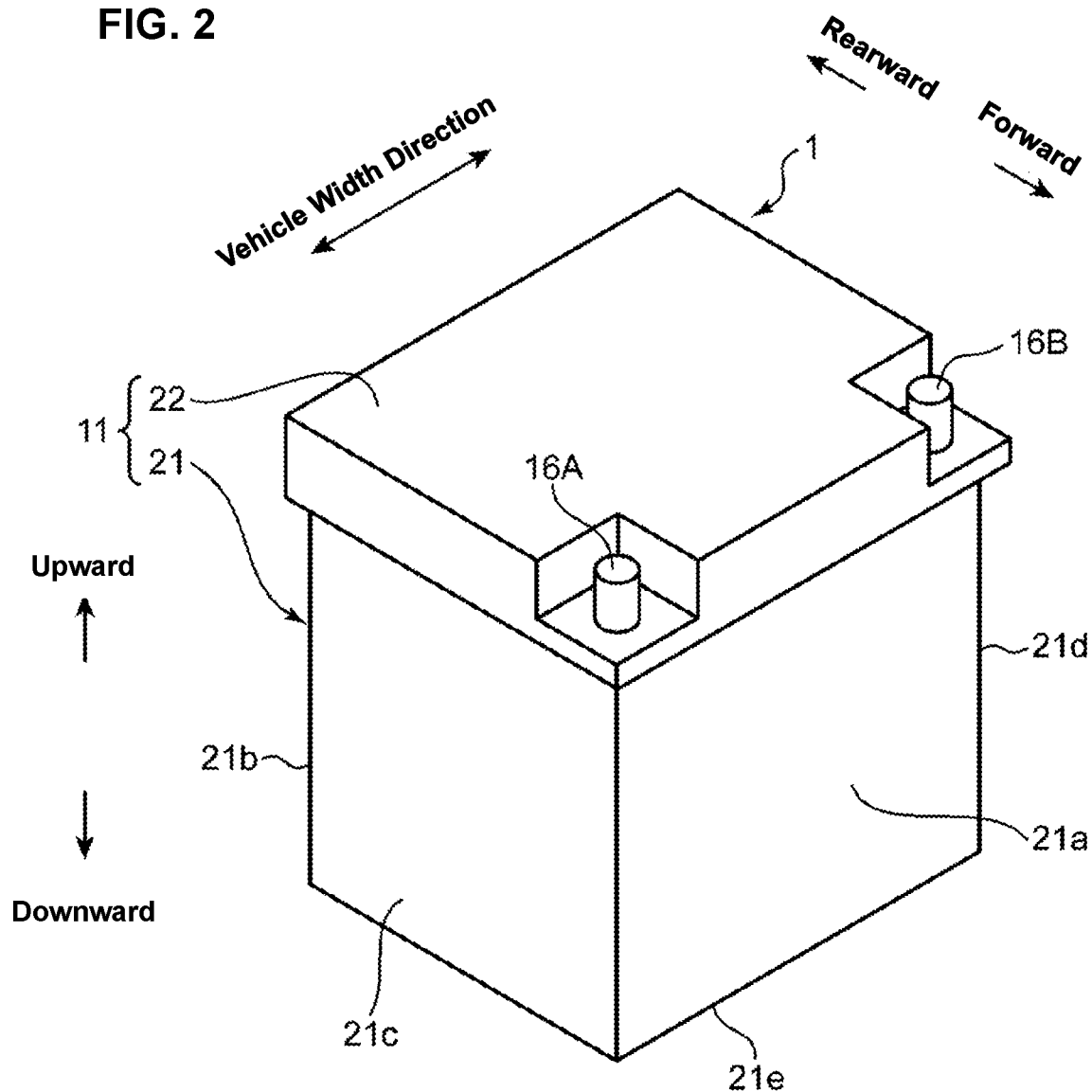
FIG. 2 is a perspective view showing external appearance of the lithium-ion battery device.
Figure 3:
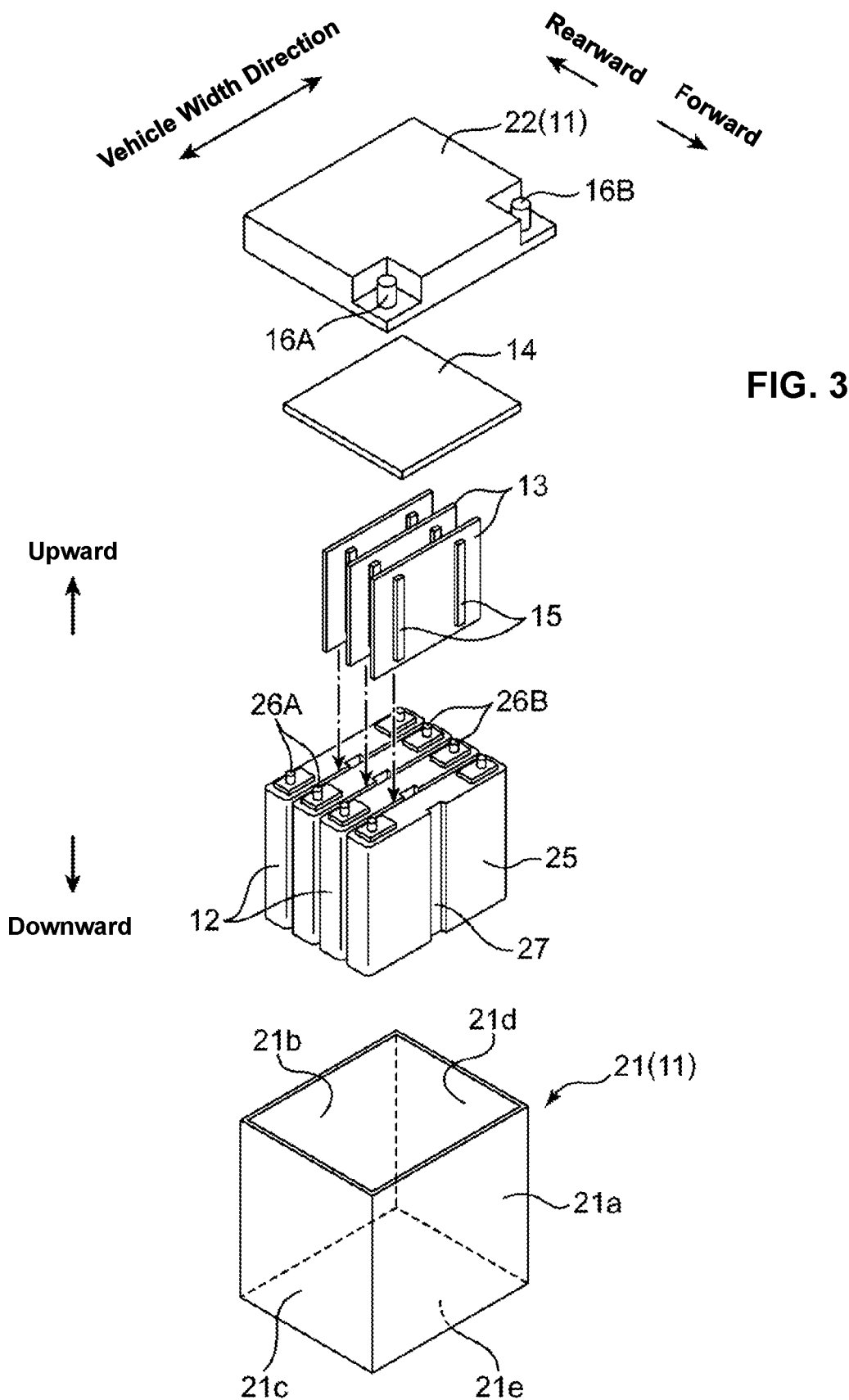
FIG. 3 is an exploded perspective view showing a structure of the lithium-ion battery device.
Figure 4:
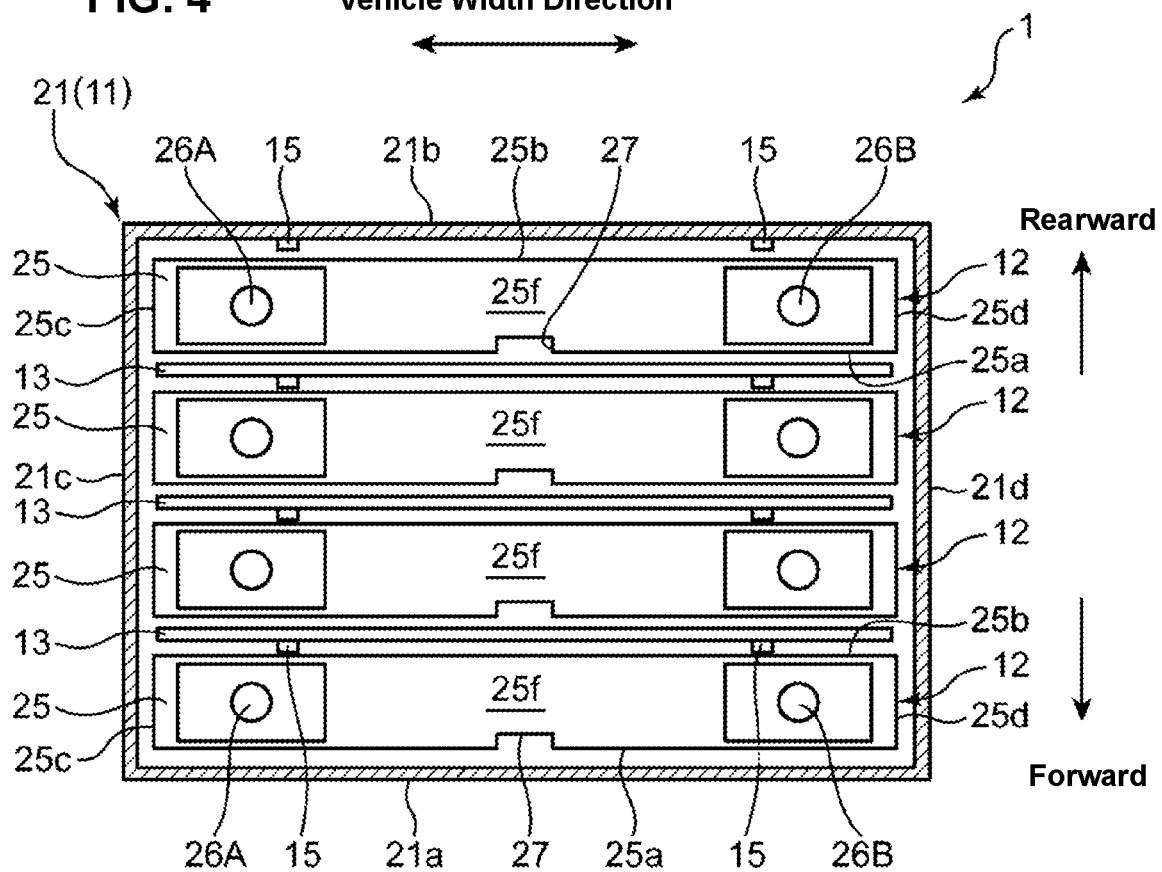
FIG. 4 is a plan-sectional view showing an inside of the lithium-ion battery device.

FIG. 2 is a perspective view showing external appearance of the battery device 1, FIG. 3 is an exploded perspective view showing a structure of the battery device 1, and FIG. 4 is a plan-sectional view showing an inside of the battery device 1. As shown in these figures, the battery device 1 comprises a housing 11, plural battery cells 12, plural inter-cell plates 13, a base plate 14, plural vertical ribs 15, and a pair of external terminals 16A, 16B. The battery cells 12, the inter-cell plates 13, the base plate 14, and the vertical ribs 15 are stored inside the housing 11. In the present embodiment, the external terminal 16A is a plus (positive) side terminal, and the external terminal 16B is a minus (negative) side terminal. Hereafter, when the both need to be differentiated in particular, the external terminal 16A will be referred to as the external positive-electrode terminal 16A, and the external terminal 16B will be referred to as the external negative-electrode terminal 16B.

The housing 11 comprises a housing body 21 and a housing cover 22. The housing body 21 is a boxy member with an open upper face, and comprises a bottom face 21e which is of a rectangular shape in a top view and a front face 21, a rear face 21b, and a pair of side faces 21c, 21d which respectively rise upwardly from a peripheral edge of the bottom face 21e. The front face 21a and the rear face 21b are provided to face each other in the vehicle longitudinal direction, wherein the front face 21a is positioned on the vehicle forward side of the rear face 21b. The pair of side faces 21c, 21d are provided to face each other in the vehicle width direction. The housing cover 22 is attached to the housing body 21 so as to close an opening of the upper face of the housing body 21. The housing 11 (the housing body 21 and the housing cover 22) is made from a metal material having high strength, fiber reinforced resin, or the like so that this member 11 has the relatively high rigidity.

The pair of external terminals 16A, 16B (the external positive-electrode terminal 16A and the external negative-electrode terminal 16B) are provided to protrude upwardly from the housing cover 22 at different two points which are spaced apart from each other in the vehicle width direction.

The plural battery cells 12 are provided to stand in a line in the vehicle longitudinal direction inside the housing 11. In the present embodiment, the four battery cells 12 are arranged inside the housing 11. Each battery cell 12 is a so-called square type of battery cell, which comprises a cell case 25 which is a flat rectangle (plate-shaped body) having a vehicle-longitudinal-direction size (thickness) which is smaller than a vehicle-width-direction size and a pair of terminals 26A, 26B which protrude upwardly from the cell case 25. In the present embodiment, the terminal 26A is a plus (positive) side terminal, and the terminal 26B is a minus (negative) side terminal. Hereafter, when the both need to be differentiated in particular, the terminal 26A will be referred to as the positive-electrode terminal 26A, and the terminal 26B will be referred to as the negative-electrode terminal 26B.

The plural battery cells 12 are stored inside the housing 11 in a state where these battery cells face each other, having a small gap therebetween, in a thickness direction (longitudinal direction). In other words, the plural battery cells 12 are provided to stand in a line in the longitudinal direction inside the housing 11 in a state where respective main faces of the plural cell cases 25 (front faces 25a and rear faces 25b, which will be described later) are parallel to the front face 21a and the rear face 21b of the housing body 21.

The base plate 14 electrically combines the respective positive-electrode terminals 26A of the plural battery cells 12 and connects these terminals 26A to the external positive-electrode terminal 16A, and also electrically combines the respective negative-electrode terminals 26B of the plural battery cells 12 and connects these terminals 26B to the external negative-electrode terminal 16B. The base plate 14 comprises a bus bar which interconnects the respective positive-electrode terminals 26A (the negative-electrode terminals 26B) of the plural battery cells 12, a lead plate which contacts the external positive-electrode terminal 16A (the external negative-electrode terminal 16B), and a conductive member which electrically connects the bus bar and the lead plate, specific illustration of which is omitted.

The plural inter-cell plates 13 are respectively interposed between the adjacent battery cells 12. In the present embodiment, the three inter-cell plates 13 are prepared in total so as to correspond to the four battery cells 12. The inter-cell plate 13 is a synthetic-resin made member which has a rectangular shape in a longitudinal-direction view. The inter-cell plate 13 is configured such that its thickness (longitudinal-direction size) is sufficiently smaller than that of the cell case 25 of the battery cell 12 and its vehicle-width-direction size and its vertical-direction size are substantially equal to those of the cell case 25. The inter-cell plate 13 serves as a member to perform heat insulation between the adjacent battery cells 12.

The plural vertical ribs 15 are provided adjacently to and on the rearward side of each of the battery cells 12 as shown in FIG. 4 particularly. Each of the vertical ribs 15 is a bar-shaped member which has a considerably smaller area (width size) than the main face (the front face 25a and the rear face 25b, which will be described later) of the cell case 25 of the battery cell 12 and extends in the vertical direction (see FIG. 3 as well). The vertical rib 15 is configured to extend from around an upper end of the cell case 25 to around a lower end of the cell case 25 and have substantially the same vertical size as the cell case 25. Herein, the vertical rib 15 corresponds to a "gap-forming portion" of the present invention.

Specifically, the vertical ribs 15 are provided between the battery cell 12 (except the rearmost-stage battery cell 12) and the inter-cell plate 13 rearwardly adjacent to this battery cell 12. The two vertical ribs 15 are provided for each of the battery cells 12. Hereafter, the other (three) battery cells 12 than the rearmost-stage battery cell 12 may be referred to as the front three-stage battery cells 12, and the plural (six) vertical ribs 15 which are provided to correspond to the front three-stage battery cells 12 may be referred to as the front three-stage vertical ribs 15. Each of the front three-stage vertical ribs 15 is fixed to a front face of each of the inter-cell plates 13 by means of adhesion or the like. The inter-cell plate 13 and the vertical ribs 15 may be formed as an integrated resin molding, of course.

Meanwhile, the two vertical ribs 15 are provided between the rearmost-stage battery cell 12 and the rear face 21b of the housing 11 (housing body 21) rearwardly adjacent to the rearmost-stage battery cell 12. Hereafter, these two vertical ribs 15, i.e., the two vertical ribs 15 which are provided to correspond to the rearmost-stage battery cell 12, may be referred to as the rearmost-stage vertical ribs 15. The rearmost-stage vertical ribs 15 are fixed to the rear face 21b of the housing body 21 by means of adhesion or the like.

The distance between each of the three-stage battery cells 12 and the front face of each of the inter-cell plates 13 is set such that the front three-stage vertical ribs 15 substantially contact (or is close to) the battery cell 12 positioned on its forward side. In other words, a gap which corresponds to (or is slightly wider than) the thickness of the vertical rib 15 is formed between the inter-cell plate 13 and the rearwardly-positioned battery cell 12. While the thickness of the vertical rib 15 can be set properly, the thickness of 2 mm may be preferable, for example, in order to prevent the battery device 1 from becoming large-sized.

A gap is formed between the rearmost-stage battery cell 12 and the rearmost-stage vertical ribs 15. It is preferable that this gap be set at the thickness of the vertical rib 15 or less, and nearly zero is applicable.

Herein, the inter-cell plate 13 which is provided adjacently to each of the front three-stage battery cells 12, interposing the vertical ribs 15 therebetween, corresponds to an "adjacent member" of the present invention. Further, the rear face 21b of the housing body 21 which is provided adjacently to the rearmost-stage battery cell 12, interposing the vertical ribs 15 therebetween, corresponds to another "adjacent member" of the present invention.

[Detailed Structure of Battery Cell]

Figure 5:
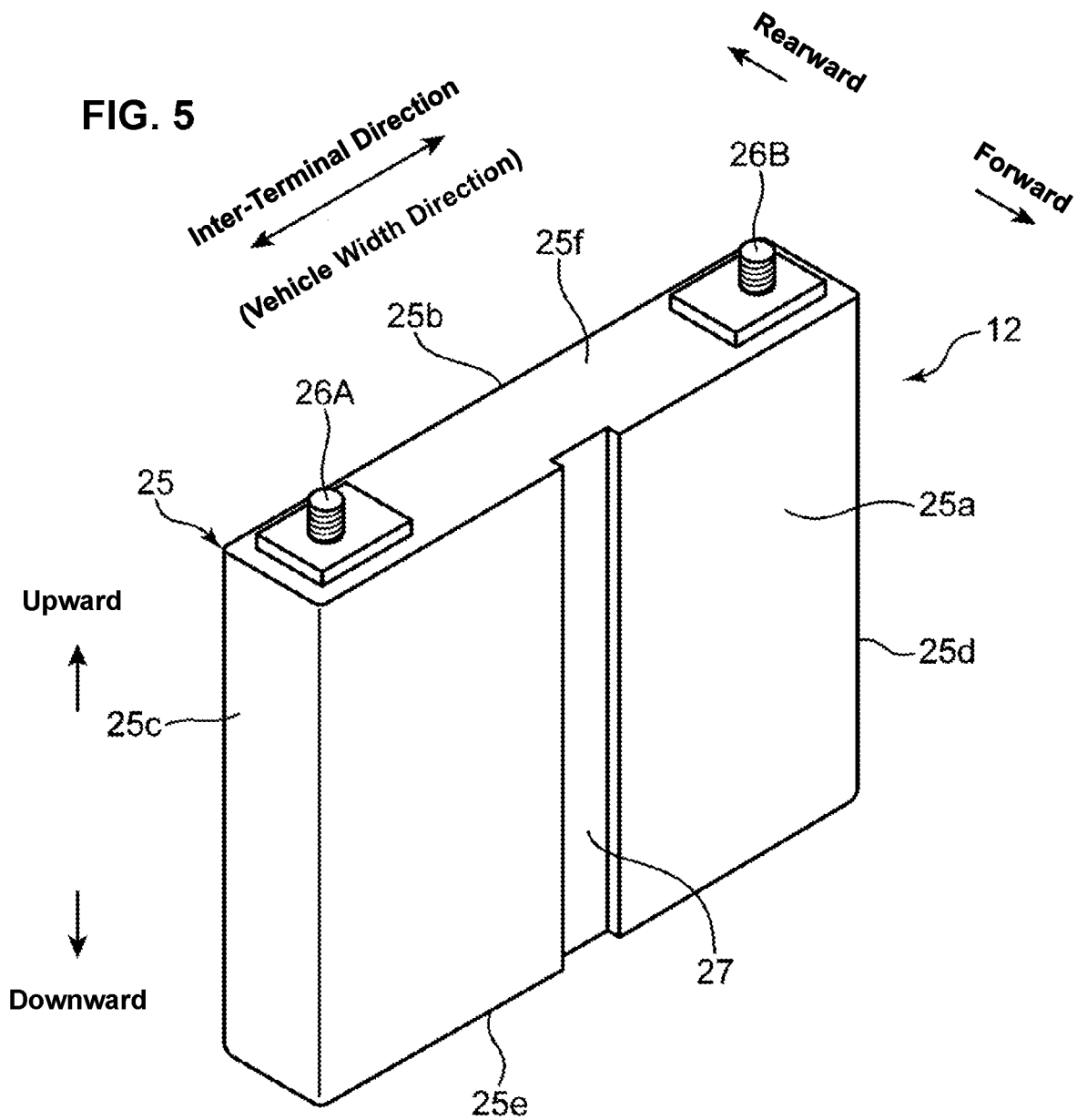
FIG. 5 is a perspective view showing external appearance of a battery cell.

FIG. 5 is a perspective view showing external appearance of the battery cell 12. As shown in FIG. 5 and the previous figure FIG. 4, the cell case 25 of the battery cell 12 has a front face 25a, a rear face 25b, a bottom face 25e, an upper face 25f, and a pair of side faces 25c, 25d. The front face 25a and the rear face 25b are provided to face each other in the vehicle longitudinal direction, wherein the front face 25a is positioned on the vehicle forward side of the rear face 25b. The bottom face 25e and the upper face 25f are provided to face each other in the vertical direction, wherein the upper face 25f is positioned above the bottom face 25e. The pair of side faces 25c, 25d are provided to face each other in the vehicle width direction.

As already described, the cell case 25 is the flat rectangle having the vehicle-longitudinal-direction size which is smaller than the vehicle-width-direction size. Therefore, the front face 25a and the rear face 25b have a larger area than the other faces of the cell case 25. For example, the area of the front face 25a and the rear face 25b is considerably larger than an area of the upper face 25f where the terminals 26A, 26B are provided. This is also applicable to area relationships between the pair of side faces 25c, 25d and the bottom face 25e. Herein, the front face 25a corresponds to a "first main face" of the present invention, and the rear face 25b corresponds to a "second main face" of the preset invention.

A concave groove 27 which extends in the vertical direction is formed at a center, in the vehicle width direction, of the front face 25a of the cell case 25. The concave groove 27 is configured such that it is recessed rearwardly from another area of the front face 25a than the concave groove 27 and extends from an upper end of the front face 25a to a lower end of the front face 25a, having a constant groove width (a vehicle-width-direction size). In the present embodiment, the battery cell 12 is arranged such that an arrangement direction of the pair of terminals 26A, 26B (hereafter, referred to as an "inter-terminal direction") matches the vehicle width direction. In other words, the concave groove 27 is provided to extend in a direction perpendicular to the inter-terminal direction at a central portion, in the inter-terminal direction, of the front face 25a of the cell case 25.

Figure 6:
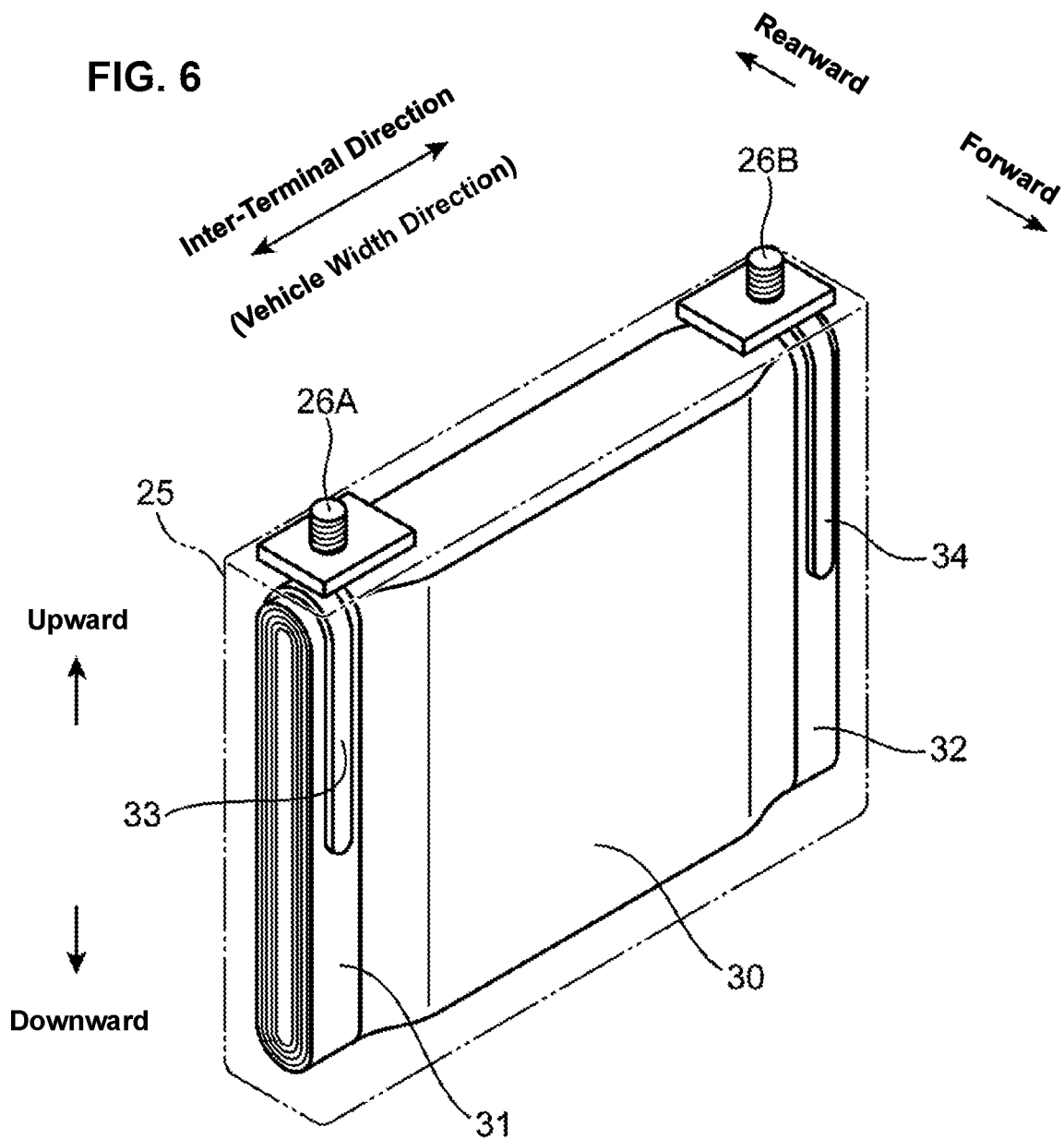
FIG. 6 is a transparent-perspective view showing an internal structure of the battery cell.
Figure 7:
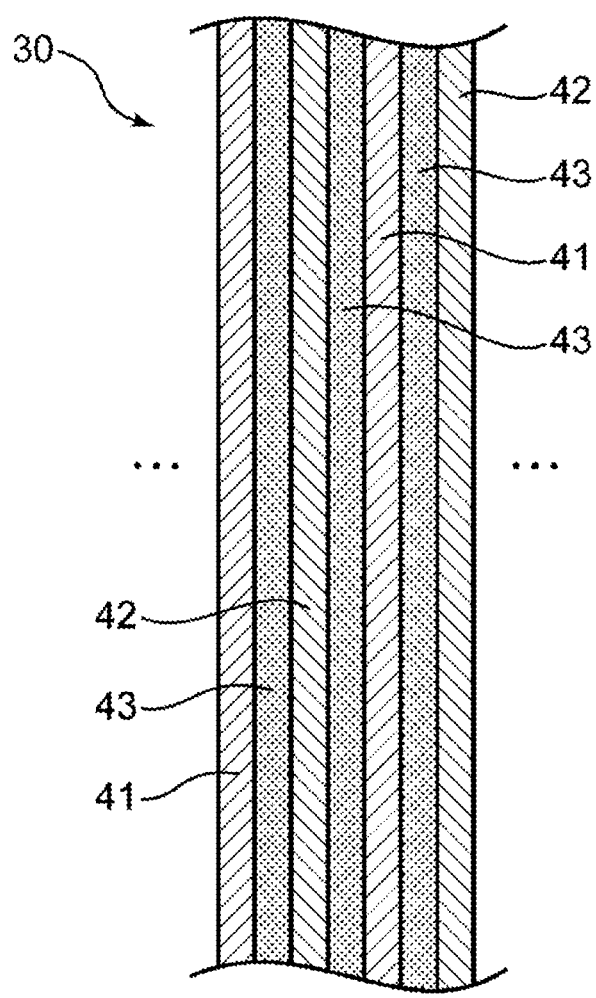
FIG. 7 is a sectional view showing a structure of an electrode body.

FIG. 6 is a transparent-perspective view showing an internal structure of the battery cell 12 (showing an internal part of the battery cell 12, illustrating the cell case 25 by an imaginary line). As shown in this figure, an electrode body 30 is arranged inside the cell case 25. As shown in FIG. 7, the electrode body 30 comprises a positive-electrode sheet 41, a negative-electrode sheet 42, and a separator 43. The positive-electrode sheet 41 is a band-shaped sheet which is made by adhering a positive-electrode active substance onto a surface of a base member, such as an aluminum foil. The negative-electrode sheet 42 is a band-shaped sheet which is made by adhering a negative-electrode active substance onto a surface of a base member, such as a cupper foil. The separator 43 is a band-shaped sheet (insulating foil) made from porous resin. The separator 43 is impregnated with an nonaqueous electrolyte (e.g., made by dissolving lithium salt in an organic solvent). Any appropriate known substance is applicable in combination of the positive-electrode active substance and the negative-electrode active substance as long as storing/releasing of the lithium ion is possible.

The positive-electrode sheet 41, the negative-electrode sheet 42, and the separator 43 are rolled up around an axis extending in the inter-terminal direction and laminated in a flat shape. Specifically, the positive-electrode sheet 41, the negative-electrode sheet 42, and the separator 43 are rolled up continuously in a layer shape such that the separator 43 is interposed between the positive-electrode sheet 41 and the negative-electrode sheet 42.

As shown in FIG. 6, a pair of foil bodies 31, 32 are provided at both-end portions, in the inter-terminal direction, of the electrode body 30. The foil body 31 is configured such that respective base bodies (e.g., aluminum foils) of the plural positive-electrode sheets 41 included in the electrode body 30 are provided to extend toward the positive-electrode terminal 26A and these extending portions are crimped. The foil body 32 is configured such that respective base bodies (e.g., cupper foils) of the plural negative-electrode sheets 42 included in the electrode body 30 are provided to extend toward the negative-electrode terminal 26B and these extending portions are crimped.

A pair of collectors 33, 34 are respectively joined to the pair of foil bodies 31, 32 by welding or the like. The collector 33 (34) is joined to the foil body 31 (32) in a state where an upper portion of the foil body 31 (32) is interposed. Hereafter, the collector 33 joined to the foil body 31 will be referred to as the positive-electrode collector 33, and the collector 34 joined to the foil body 32 will be referred to as the negative-electrode collector 34. The positive-electrode collector 33 electrically interconnects the positive-electrode sheets 41 of the electrode body 30 and the positive-electrode terminal 26A via the foil body 31. The negative-electrode collector 34 electrically interconnects the negative-electrode sheets 42 of the electrode body 30 and the negative-electrode terminal 26B via the foil body 31.

Figure 8:
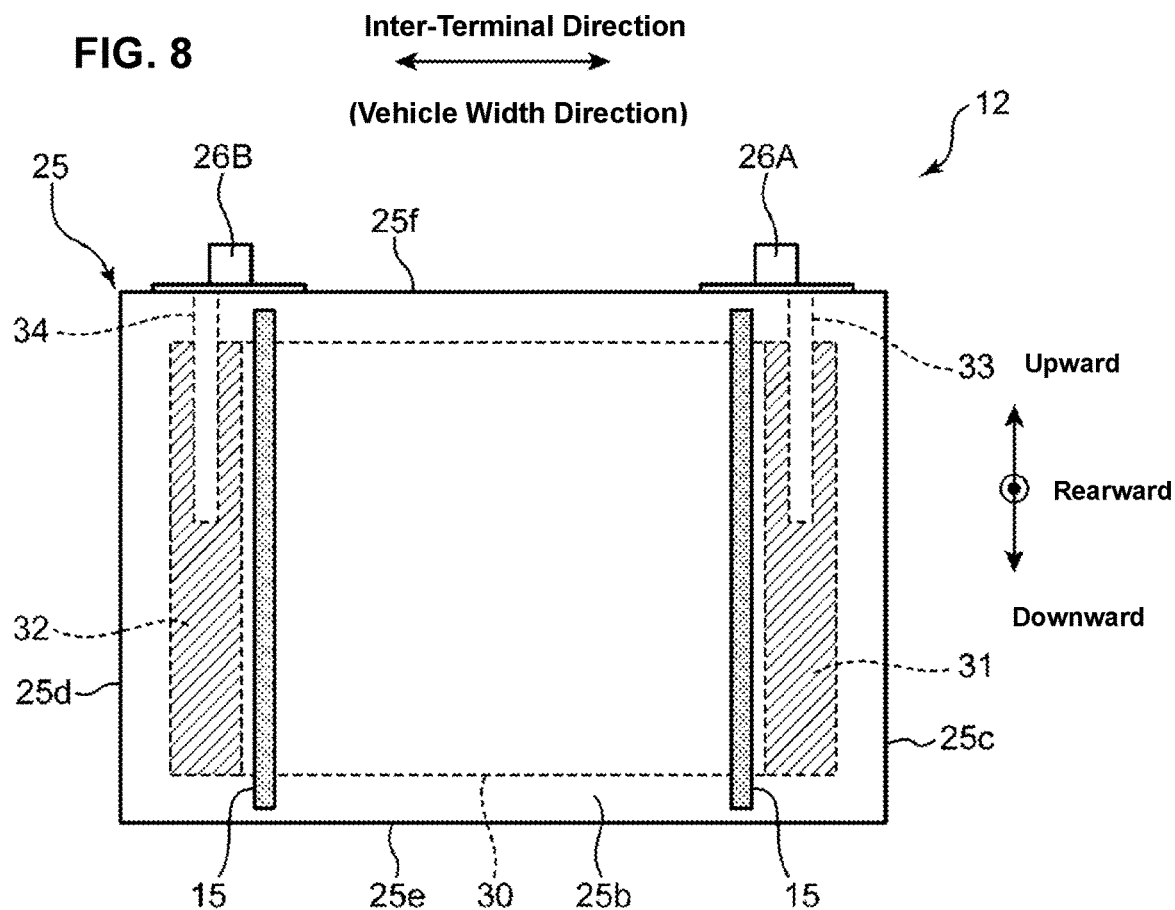
FIG. 8 is a back view of the battery cell.

FIG. 8 is a back view of the battery cell 12. In FIG. 8, the pair of vertical ribs 15 positioned on the rearward side of each of the battery cells 12 are illustrated as a dark area. Further, the electrode body 30, the foil bodies 31, 32, and the collectors 33, 34 which are located inside of the battery cell 12 are illustrated by a broken line, and the foil bodies 31, 32 are illustrated as a hatching area.

As shown in FIG. 8, the pair of (two) vertical ribs 15 arranged on the rearward side of each of the battery cells 12 are provided to be relatively-greatly spaced apart from each other in the inter-terminal direction such that these ribs 15 face two points (positions close to both end points in the inter-terminal direction) which are respectively positioned at an outward side of the battery cell 12. The vertical ribs 15 are positioned such that these ribs 15 do not overlap with the pair of collectors 33, 34 in a vehicle-longitudinal-direction view. Specifically, the pair of vertical ribs 15 are slightly offset from the pair of collectors 33, 34 toward a central side, in the inter-terminal direction, of the battery cell 12. In the present embodiment, these vertical ribs 15 are located at the central-side offset positions not only from the collectors 33, 34 but from the foil bodies 31, 32 provided at the both ends of the electrode body 30.

As described above, the pair of vertical ribs 15 facing the outward-side points of the battery cell 12 are relatively-greatly spaced apart from the concave groove 27 formed at the center of the front face 25a of the cell case 25 in the inter-terminal direction as shown in FIG. 4. Each distance, in the inter-terminal direction, between the concave groove 27 and the vertical ribs 15 is set to be nearly equal. In other words, the concave groove 27 is formed at a position which corresponds to the center between the pair of vertical ribs 15.

Operations and Effects

As described above, the battery device 1 of the first embodiment is configured such that the plural battery cells 12 are provided inside the housing 11 in a state where these battery cells 12 stand in a line in the longitudinal direction and the pair of vertical ribs 15 are provided to be spaced apart from each other in the inter-terminal direction of the battery cell 12 between the rear face 25b of the cell case 25 of each of the battery cells 12 and the member (the inter-cell plate 13 or the rear face 21b of the housing body 21) which is positioned adjacently to the rear face 25b. According to this structure, the electrode body 30 can be properly suppressed from being damaged when the load is inputted to the battery cell 12.

For example, when an obstacle contacts the battery device 1 from the forward side in a vehicle frontal collision, a relatively-large collision load is applied to the front face 21a of the housing 11 (housing body 21). Since the housing 11 has the high rigidity, the collision load applied from the forward side is received at the housing 11 basically, so that the collision load is prevented from being directly transmitted to the battery cell 12. However, in a case where the collision load is so large or the collision load acts partially because of the small width size of the obstacle or the like, there happens a case where a part of the load which has not been received at the housing 11 is applied to the cell case 25 of the foremost (foremost-stage) battery cell 12. Further, in a case where the collision load is applied to the foremost battery cell 12, there happens a case where the collision load is applied to the rearward-side battery cell 12 via the foremost-stage battery cell 12 which has retreated, receiving the collision load. Herein, according to the above-described first embodiment, the vertical ribs 15 provided on the rearward side of each of the battery cells 12 can suppress the cell case 25 of each of the battery cells 12 from being deformed in such a manner that the electrode body 30 inside the cell case 25 is damaged, whereby the electrode body 30 can be protected from its damaging.

Figure 9:
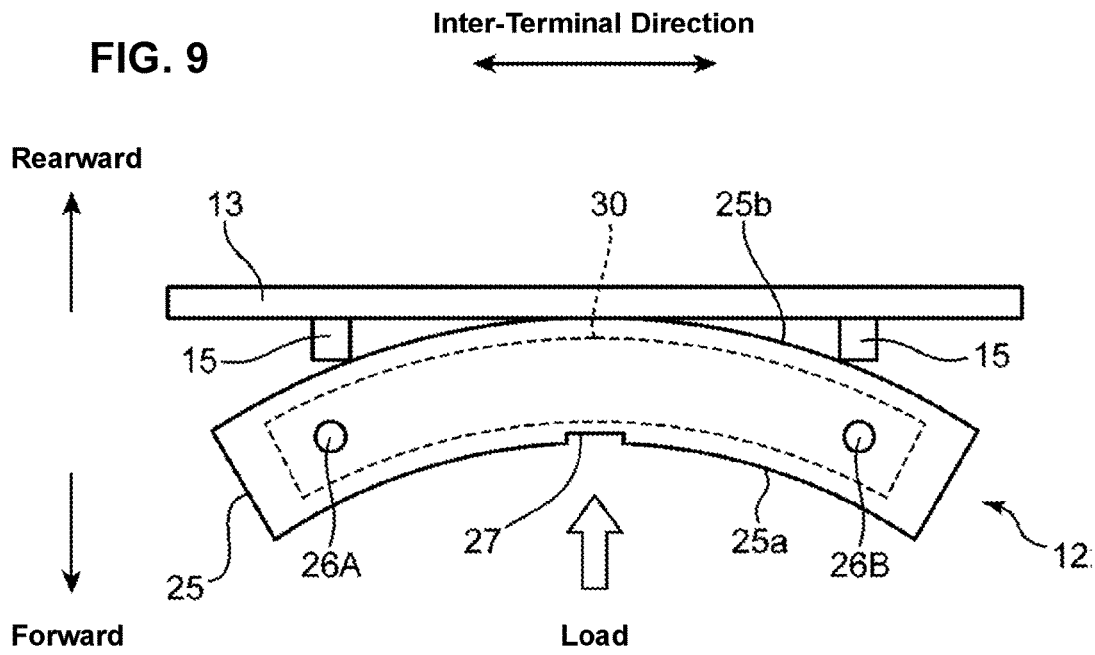
FIG. 9 is an explanatory diagram showing a deformation manner when a load is inputted to the battery cell.

That is, in the above-described first embodiment, since the pair of vertical ribs 15 provided to be spaced apart from each other in the inter-terminal direction are arranged between the rear face 25b of the cell case 25 of each of the battery cells 12 and the adjacent member (the inter-cell plate 13 or the rear face 21b of the housing body 21) provided adjacently to the rear face 25, a space formed between the both vertical ribs 15 can be used as a space to allow bending deformation of the cell case 25. For example, when the collision load is inputted from the forward side to the cell case 25 of the foremost-stage battery cell 12 in the vehicle frontal collision, the cell case 25 rearwardly pressed by this collision load is received at the rear-side vertical ribs 15 positioned on the rearward side of this cell case (the pair of vertical ribs 15 fixed to the foremost-stage inter-cell plate 13), so that there occurs a bending moment to bend the cell case 25 rearwardly about the these vertical ribs 15 serving as a fulcrum. This bending moment acts, as shown in FIG. 9, such that the cell case 25 is deformed in an arched shape and a middle portion of the cell case 25 which is located between the pair of vertical ribs 15 is displaced rearwardly (in FIG. 9, the thickness of the vertical rib 15 is illustrated exaggeratedly for the better understanding). Herein, the space formed between the pair of vertical ribs 15 performs as the space to allow bending deformation of the middle portion of the cell case 25, thereby promoting the bending deformation of the cell case 25. Then, since the collision energy is absorbed sufficiently by the bending deformation of the cell case 25, it is suppressed that the cell case 25 is deformed such that it is crushed greatly in the thickness direction. Thereby, it can be suppressed that there occur the damage of the electrode body 30 inside the cell case 25 and the short circuit caused by this damage. For example, in a case where the separator 43 inside the electrode body 30 is broken, the positive-electrode sheet 41 and the negative-electrode sheet 42 contact each other directly (short circuit) and thereby large current flows, so that there is a concern that there may happen abnormal heat-generation. According to the above-described present structure where changing of the thickness of the cell case 25 is properly small, it can be avoided that there occurs a situation where a compressive force large enough to cause the breakage of the separator 43 is applied to the electrode body 30, thereby effectively suppressing the short circuit.

Further, even in a case where the collision load is applied to the rearward-side battery cell 12 via the foremost-stage battery cell 12, since the possibility of the cell case 25 is reduced by the performance of the vertical ribs 15 positioned on the rearward side of the battery cell 12 similarly to the above-described case, the damage of the electrode body 30 and the short circuit caused by this damage can be suppressed. Moreover, since the amount of input load tends to become smaller for the rearwardly-positioned battery cell 12, the damage risk of the electrode body 30 for the rearwardly-positioned battery cell 12 can be reduced more.

That is, according to the first embodiment, by the relatively simple structure that the vertical ribs 15 are provided between the rear face 25b of the cell case 25 and the adjacent member adjacent to this rear face 25b, the deformation of the cell case 25 can be controlled such that the thickness of the cell case 25 is not reduced (crushed) greatly, so that the damage of the electrode body 30 inside the cell case 25 and the short circuit caused by this damage can be suppressed.

Further, in the above-described first embodiment, since the concave groove 27 extending in the vertical direction is formed at the central portion of the front face 25a of the cell case 25, the concave groove 27 can be made to function as a starting point of the bending deformation of the cell case 25. Thereby, the controllability of the deformation of the cell case 25 further improves, so that the possibility of the crush of the cell case 25 (thickness's great reduction) can be reduced, thereby effectively suppressing the damage (short circuit) of the electrode body 30 inside the cell case 25.

Moreover, according to the first embodiment, since the pair of vertical ribs 15 are positioned such that the vertical ribs 15 do not overlap with the pair of collectors 33, 34 interconnecting the electrode body 30 and the terminals 26A, 26B in the inter-terminal direction, a situation where the collectors 33, 34 and the cell case 25 contact each other when the load is inputted from the vehicle outward side can be avoided. That is, there is a concern that the rear face 25b of the cell case 25 may be partially deformed by receiving a reaction force from the vertical ribs 15 when the above-described load is inputted. According to the first embodiment, however, since the collectors 33, 34 and the vertical ribs 15 do not overlap with each other in the vehicle-longitudinal-direction view, it is avoided that the distance between the rear face 25b and the collectors 33, 34 is reduced greatly even if the reaction force from the vertical ribs 15 have caused the rear face 25b of the cell case 25 to be partially deformed forwardly. Thereby, contacting of the cell case 25 and the collectors 33, 34 and the short circuit caused by this contacting can be suppressed.

PRACTICAL EXAMPLE

Figure 10:
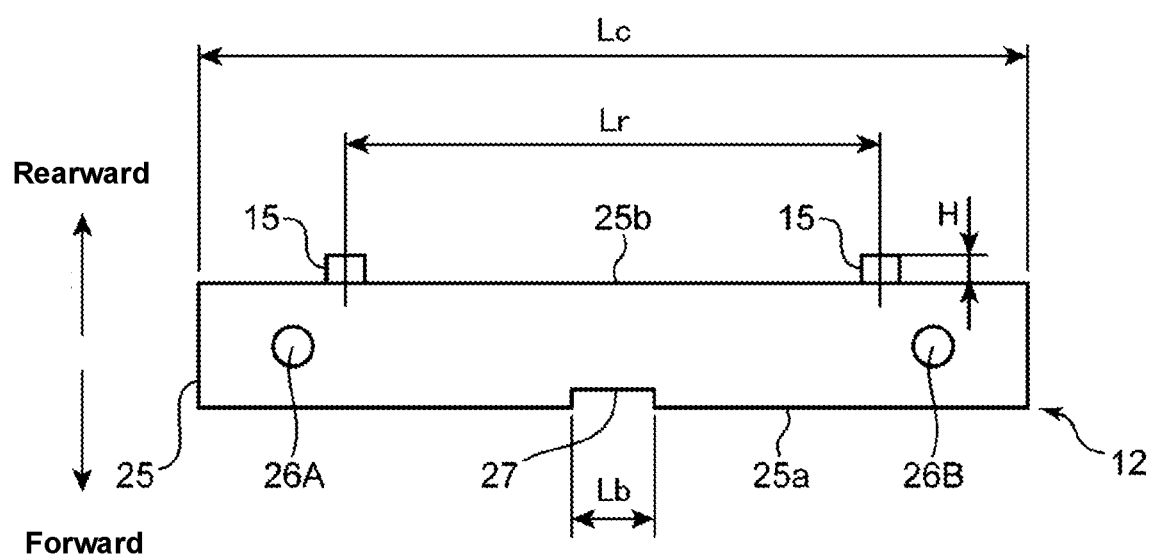
FIG. 10 is a plan view showing a size of each part of the battery cell.

The inventors of the present invention and others executed simulation for confirming the effects of the above-described first embodiment. Specifically, as shown in FIG. 10, the simulation of inputting a specified load to the center of the front face 25a of the cell case 25 was executed for each case by variously changing a rib distance Lr which corresponds to a distance, in the inter-terminal direction, between the pair of vertical ribs 15 (a distance between the respective centers of the both ribs 15) and a groove width Lb which corresponds to a width size of the concave groove 27 of the front face 25a of the cell case 25. Further, a stress which acts on the electrode body 30 for each of the cases (hereafter, referred to as an "electrode-body stress") was specified. In this simulation, thickness H which corresponds to a longitudinal-direction size of the vertical rib 15 is a constant value, 2 mm.

Figure 11A:
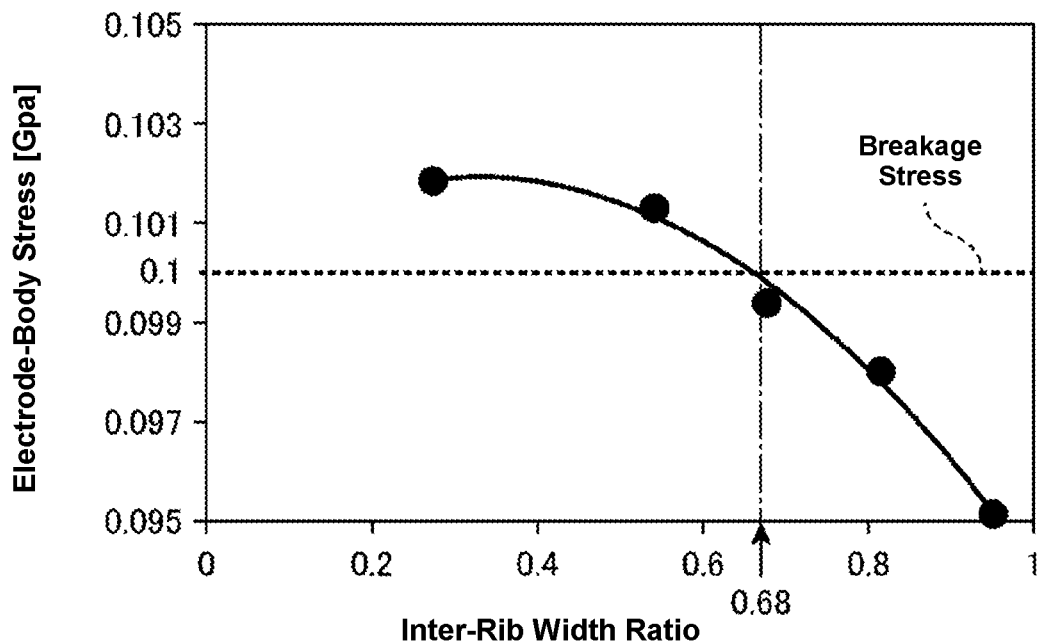
FIGS. 11A and 11B show results of simulation executed to confirm operations and effects of the present invention.
Figure 11B:
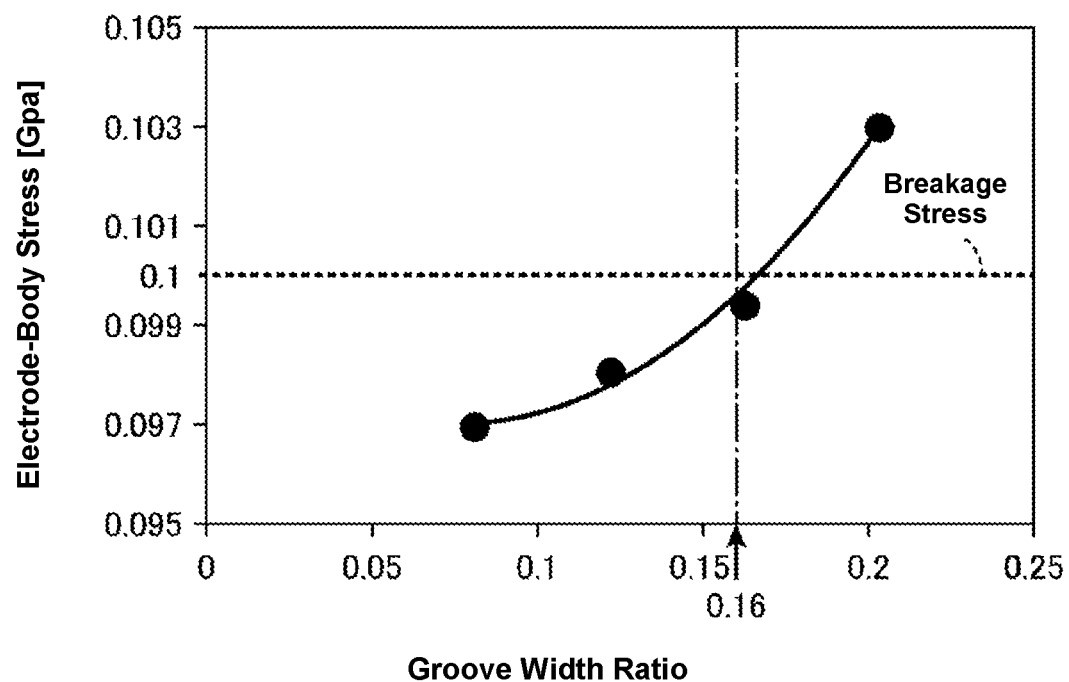

FIGS. 11A and 11B are graphs showing results of the above-described simulation. Specifically, FIG. 11A is the graph showing a relationship between an inter-rib width ratio (Lr/Lc) and an electrode-body stress, wherein the above-described inter-rib width ratio is defined as a ratio (=Lr/Lc) of a cell width Lc which corresponds to the width size (inter-terminal direction size) of the cell case 25 of the battery cell 12 and the above-described rib distance Lr. FIG. 11B is the graph showing a relationship between a groove width ratio (Lb/Lc) and the electrode-body stress, wherein the above-described groove width ratio is defined as a ratio (=Lb/Lc) of the cell width Lc and the above-described groove width Lb. In the both graphs, a "breakage stress" shown by a broken line means the electrode-body stress where the separator 43 gets broken, which was regarded as 0.1 (GPa) in the present simulation.

As shown in FIG. 11A, there is a tendency that the electrode-body stress becomes lower as the inter-rib width ratio (Lr/Lc) becomes larger. Particularly, as the inter-rib width ratio (Lr/Lc) increases up to 0.68 or greater, the electrode-body stress decreases to a level below the breakage stress (0.1). Accordingly, it may be preferable that the inter-rib width ratio (Lr/Lc) be set at 0.68 or greater.

As shown in FIG. 11B, the relationship between the groove-width ratio (Lb/Lc) and the electrode-body stress is opposite to the above-described relationship between the inter-rib width ratio (Lr/Lc) and the electrode-body stress (FIG. 11A). That is, there is a tendency that the electrode-body stress becomes lower as the groove width ratio (Lb/Lc) becomes smaller. Particularly, as the groove width ratio (Lb/Lc) decreases to 0.16 or smaller, the electrode-body stress decreases to the level below the breakage stress (0.1). Accordingly, it may be preferable that the groove width ratio (Lb/Lc) be set at 0.16 or smaller.

According to the above-described results, it has been found that it is preferable in protecting the separator 43 from the breakage that the rib distance Lr be set such that the inter-rib width ratio (Lr/Lc) is 0.68 or greater and also the groove width Lb be set such that the groove width ratio (Lb/Lc) is 0.16 or smaller.

(2) Second Embodiment

While the above-described first embodiment is configured such that the battery device 1 is arranged in the engine room R formed at the front portion of the vehicle body 2 and a pair of vertical ribs 15 are provided on the rearward side of each of the battery cells 12 as measures for the load inputted to the battery device 1 from the forward side in the vehicle frontal collision or the like, the battery device may be arranged at a rear portion of the vehicle body 2. In this case, it is desired that measures for a load inputted to the battery device from a rearward side in a vehicle rear collision or the like is taken. Hereafter, another example of the battery device taking the measures for the load inputted from the rearward side will be described as a second embodiment of the present invention.

Figure 12:
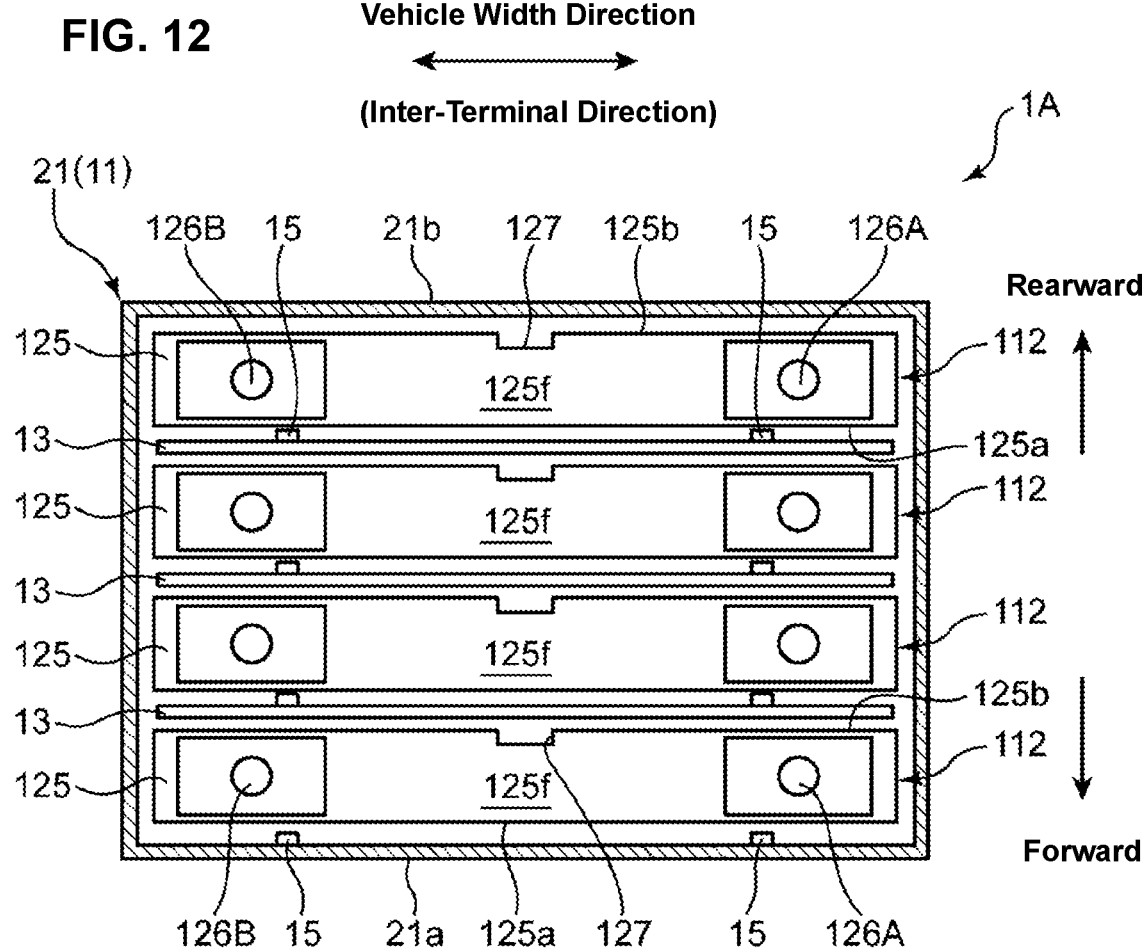
FIG. 12 is a plan-sectional view, corresponding to FIG. 4, for explaining a second embodiment of the present invention.

FIG. 12 is a plan-sectional view, corresponding to FIG. 4, showing a structure of a battery device 1A according to the second embodiment. In FIG. 12, the same structural elements as the first embodiment are denoted by the same reference characters, specific description of which will be omitted. As shown in this figure, the battery device 1A comprises plural (four) battery cells 112 which are provided to stand in a line in the longitudinal direction inside the housing 11. The battery cell 112 comprises a cell case 125 which is a flat rectangle (plate-shaped body) having a vehicle-longitudinal-direction size (thickness) which is smaller than a vehicle-width-direction size and a pair of electrodes 126A, 126B which protrude upwardly from an upper face 125f of the cell case 125. In other words, the cell case 125 is configured such that a front face 125a and a rear face 125b have a larger area than the other faces of the cell case 125. The cell case 125 of the battery cell 112 has a concave groove 127 which extends in the vertical direction at a central portion, in the vehicle width direction (in the inter-terminal direction of the battery cell 112), of the rear face 125b.

Each of the inter-cell plates 13 is provided between the adjacent battery cells 112. A pair of vertical ribs 15 protruding rearwardly are provided at the rear face of the inter-cell plate 13. Further, another pair of vertical ribs 15 protruding rearwardly are provided at the front face 21a of the housing body 21 as well. In other words, the two vertical ribs 15 are provided for each of the battery cells 112. The pair of (two) vertical ribs 15 for each of the battery cells 112 are provided to be spaced apart from each other in the vehicle width direction (in the inter-terminal direction). Further, the pair of vertical ribs 15 are positioned such that these vertical ribs 15 do not overlap with the pair of collectors 33, 34 (FIG. 8) in the vehicle-longitudinal-direction view.

As described above, in the second embodiment, since the pair of vertical ribs 15 provided to be spaced apart from each other in the inter-terminal direction are provided between each of the battery cells 112 and the adjacent member (the inter-cell plate 13 and the front face 21a of the housing body 21) forwardly adjacent to this battery cell 112, the cell case 125 of the battery cell 112 is deformed in the arched shape when the collision load is inputted from the rearward side to the battery device 1A in the vehicle rear collision or the like because of the similar reason to the above-described first embodiment. Moreover, this deformation is promoted by the concave groove 127 formed at the central portion of the rear face 125b of the cell case 125 (at a middle position between the pair of vertical ribs 15). Thereby, crushing of the cell case 125 is so suppressed that the inside of the electrode body 30 (FIG. 6) can be protected.

Herein, in the second embodiment, the rear face 125b of the cell case 125 corresponds to a "first main face" of the present invention, and the front face 125a of the cell case 125 corresponds to a "second main face" of the preset invention. Further, the inter-cell plate 13 which is provided adjacently to each of the rear three-stage battery cells 112, interposing the vertical ribs 15 therebetween, corresponds to an "adjacent member" of the present invention. Further, the front face 21a of the housing body 21 which is provided adjacently to the foremost-stage battery cell 112, interposing the vertical ribs 15 therebetween, corresponds to another "adjacent member" of the present invention.

Third Embodiment

The battery device may be provided closely to a side face of the vehicle body. In this case, it is required that some measures for a load inputted to the battery device from an outward side, in the vehicle width direction, of the vehicle body in a vehicle side collision or the like is taken. Hereafter, further another example of the battery device taking the measures for the load inputted from the outward side, in the vehicle width direction, of the vehicle body will be described as a third embodiment of the present invention.

Figure 13:
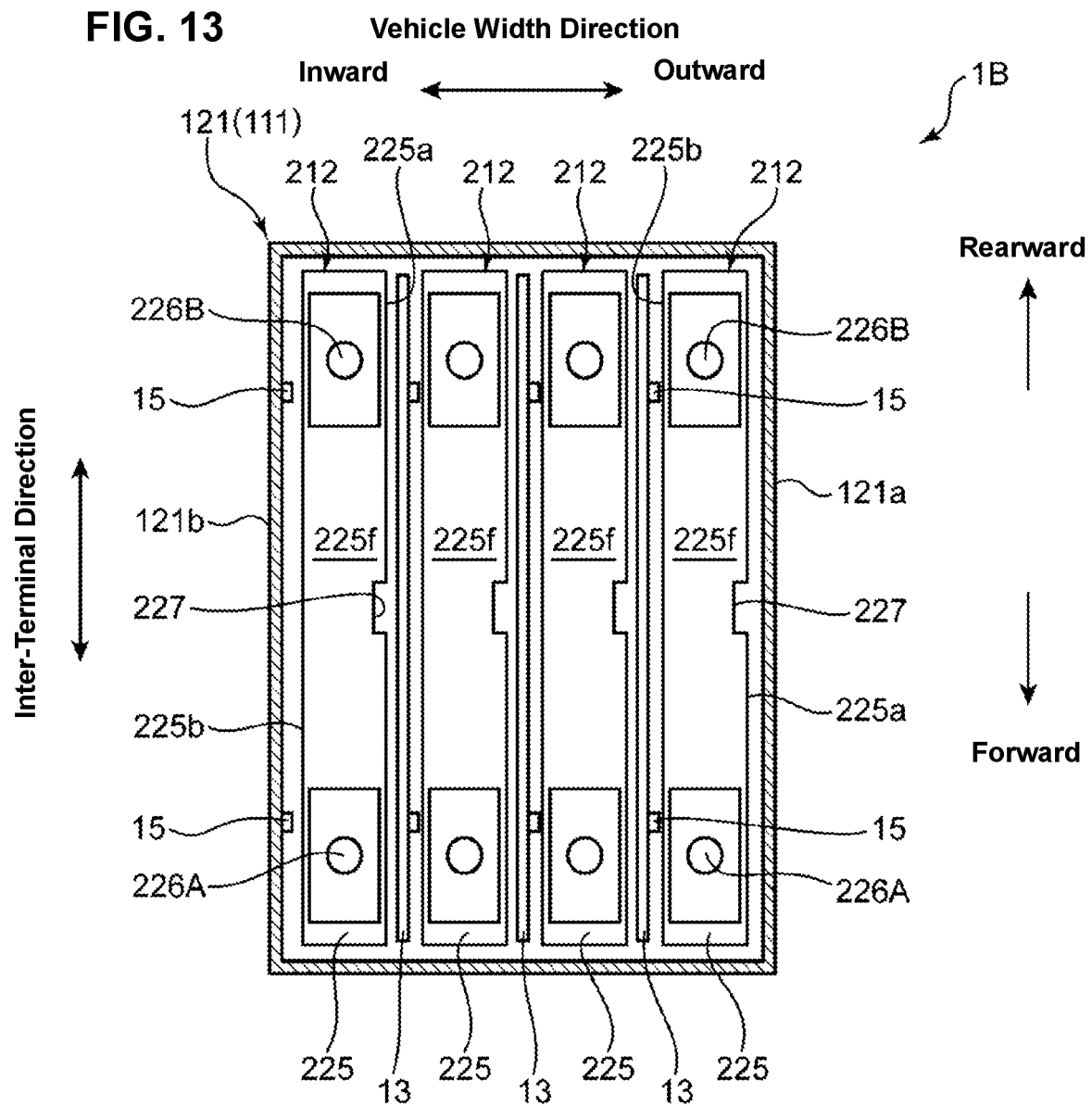
FIG. 13 is a plan-sectional view, corresponding to FIG. 4, for explaining a third embodiment of the present invention.

FIG. 13 is a plan-sectional view, corresponding to FIG. 4, showing a structure of a battery device 1B according to the third embodiment. In FIG. 13, the same structural elements as the first embodiment are denoted by the same reference characters, specific description of which will be omitted. As shown in this figure, the battery device 1B comprises plural (four) battery cells 212 provided to stand in a line in the vehicle width direction and a housing 111 storing the battery cells 212.

The battery cell 212 comprises a cell case 225 which is a flat rectangle (plate-shaped body) having a vehicle-width-direction size (thickness) which is smaller than a vehicle-longitudinal-direction size and a pair of electrodes 226A, 226B which protrude upwardly from an upper face 225f of the cell case 225. In other words, the cell case 225 is configured such that an outward face 225a and an inward face 225b have a larger area than the other faces of the cell case 225. The cell case 225 of the battery cell 212 has a concave groove 227 which extends in the vertical direction at a central portion, in the vehicle longitudinal direction (in the inter-terminal direction of the battery cell 212), of the outward face 225a.

The housing 111 comprises a boxy-shaped housing body 121. The housing body 121 comprises an outward face 121a which faces the outward face 225a of the battery cell 212 which is positioned at the most outward side and an inward face 121b which faces the inward face 225b of the battery cell 212 which is positioned at the most inward side.

Each of the inter-cell plates 13 is provided between the adjacent battery cells 212. A pair of vertical ribs 15 protruding outwardly are provided at an outward face of the inter-cell plate 13. Further, a pair of vertical ribs 15 protruding outwardly are provided at the inward face 121b of the housing body 121 as well. In other words, the two vertical ribs 15 are provided for each of the battery cells 212. The pair of (two) vertical ribs 15 for each of the battery cells 212 are provided to be spaced apart from each other in the vehicle longitudinal direction (in the inter-terminal direction). Further, the pair of vertical ribs 15 are positioned such that these vertical ribs 15 do not overlap with the pair of collectors 33, 34 (FIG. 8) in the vehicle-width-direction view.

As described above, in the third embodiment, since the pair of vertical ribs 15 provided to be spaced apart from each other in the inter-terminal direction are provided between each of the battery cells 212 and the adjacent member (the inter-cell plate 13 and the inward face 121b of the housing body 121) inwardly adjacent to this battery cell 212, the cell case 225 of the battery cell 212 is deformed in the arched shape when the collision load is inputted from the outward side to the battery device 1B in the vehicle side collision or the like because of the similar reason to the above-described first embodiment. Moreover, this deformation is promoted by the concave groove 227 formed at the central portion of the outward face 225a of the cell case 225 (at a middle position between the pair of vertical ribs 15). Thereby, crushing of the cell case 225 is so suppressed that the inside of the electrode body 30 (FIG. 6) can be protected.

Herein, in the third embodiment, the outward face 225b of the cell case 225 corresponds to a "first main face" of the present invention, and the inward face 225b of the cell case 225 corresponds to a "second main face" of the preset invention. Further, the inter-cell plate 13 which is provided adjacently to each of the (outward three-stage) battery cells 212 except the battery cell 212 which is positioned at the most inward side, interposing the vertical ribs 15 therebetween, corresponds to an "adjacent member" of the present invention. The inward face 121b of the housing body 121 which is provided adjacently to the battery cell 212 which is positioned at the most inward side, interposing the vertical ribs 15 therebetween, corresponds to another "adjacent member" of the present invention.

(4) Fourth Embodiment

While the above-described first embodiment is configured such that the plural battery cells 12 are provided to stand in a line in the vehicle longitudinal direction and the vertical ribs 15 which have the same shape are provided right behind each of the battery cells 12, the shape (thickness) of the vertical ribs 15 may be changeable according to the batter cells 12. Hereafter, an example of that will be described as a fourth embodiment.

Figure 14:
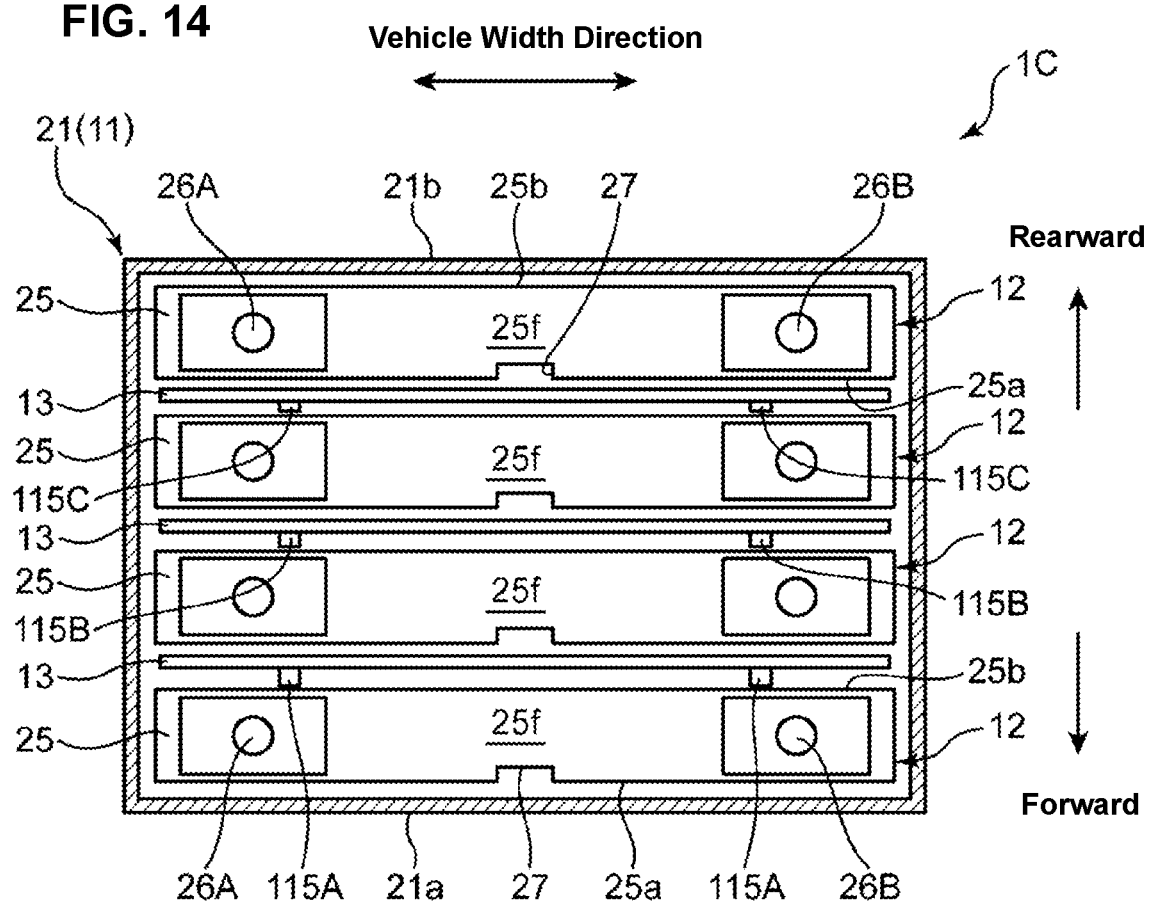
FIG. 14 is a plan-sectional view, corresponding to FIG. 4, for explaining a fourth embodiment of the present invention.

FIG. 14 is a plan-sectional view, corresponding to FIG. 4, showing a structure of a battery device 1C according to the fourth embodiment. In FIG. 14, the same structural elements as the first embodiment are denoted by the same reference characters, specific description of which will be omitted. As shown in this figure, the battery device 1C comprises the plural battery cells 12 provided to stand in a line in the vehicle longitudinal direction inside the housing 111, the plural inter-cell plates 13 provided between the adjacent battery cells 12, and plural vertical ribs 115A, 115B, 115C which protrude forwardly from the inter-cell plates 13. The plural vertical ribs 115A, 115B, 115C comprise a pair of vertical ribs 115A which protrude forwardly from the inter-cell plate 13 positioned right behind the foremost-stage battery cell 12, a pair of vertical ribs 115B which protrude forwardly from the inter-cell plate 13 positioned right behind the second-stage battery cell 12, and a pair of vertical ribs 115C which protrude forwardly from the inter-cell plate 13 positioned right behind the third-stage battery cell 12. Herein, behind the rearmost-stage battery cell 12 (at the rear face 21b of the housing body 21) is not provided any member which corresponds to the vertical rib.

The thickness (longitudinal-direction size) of the vertical ribs 115A, 115B, 115C is set such that the forwardly-positioned vertical rib has a larger thickness. That is, the thickness of the second-stage vertical rib 115B is larger than that of the third-stage vertical rib 115C, and the thickness of the foremost-stage vertical rib 115A is larger than that of the second-stage vertical rib 115B. In FIG. 14, the thickness of the foremost-stage vertical rib 115A is illustrated exaggeratedly largely for better understanding of difference of the thickness.

According to the above-described fourth embodiment, the battery device 1C can be suppressed from becoming large-sized, obtaining the above-described damage-suppression effect of the electrode body 30 (FIG. 6). That is, when the load is inputted to the battery device 1C from the vehicle forward side in the vehicle frontal collision or the like, the foremost-stage battery cell 12 tends to be deformed the most when receiving the load, and the amount of deformation which the other battery cells 12 positioned on the vehicle rearward side of this battery cell 12 have becomes gradually less. That is, the collision energy is absorbed by the foremost battery cell 12 so sufficiently (greatly) that the rearward-side battery cells 12 come to receive less influence of the collision load, so that the amount of deformation of these battery cells 12 becomes less. Therefore, according to the above-described fourth embodiment, since the thickness of the vertical ribs corresponding to the rearward-side battery cells 12 is set to become smaller, the battery device 1C can be effectively suppressed from becoming large-sized, obtaining the above-described damage-suppression effect of the electrode body 30.

Herein, in the fourth embodiment, the second-stage or third-stage battery cell 12 corresponds to an "additional batter cell" of the present invention, the (second-stage or third-stage) inter-cell plate 13 corresponding to this battery cell 12 corresponds to an "additional adjacent member" of the present invention, and the (second-stage or third-stage) vertical ribs 115B or 115C corresponding to this inter-cell plate 13 corresponds to an "additional gap-forming portion" of the present invention. For example, in combination of the foremost-stage battery cell 12 and the second-stage battery cell 12, the foremost-stage battery cell 12, the foremost-stage inter-cell plate 13, and the foremost-stage vertical rib 115A respectively correspond to the "battery cell," the "adjacent member," and the "gap-forming portion," and the second-stage battery cell 12, the second-stage inter-cell plate 13, and the second-stage vertical rib 115B respectively correspond to the "additional battery cell," the "additional adjacent member," and the "additional gap-forming portion." Further, in combination of the second-stage battery cell 12 and the third-stage battery cell 12, the second-stage battery cell 12, the second-stage inter-cell plate 13, and the second-stage vertical rib 115A respectively correspond to the "battery cell," the "adjacent member," and the "gap-forming portion," and the third-stage battery cell 12, the third-stage inter-cell plate 13, and the third-stage vertical rib 115C respectively correspond to the "additional battery cell," the "additional adjacent member," and the "additional gap-forming portion."

While in total three pairs of vertical ribs 115A, 115B, 115C which correspond to the front three-stage battery cells 12 are provided in the above-described fourth embodiment, it is possible to increase or decrease the number of the pair of the vertical ribs as long as at least two pairs of vertical ribs are provided. For example, the vertical ribs may be provided behind the rearmost-stage battery cells 12 as well, or the vertical ribs may be provided only behind the rearmost-stage battery cell 12 and behind the second-stage battery cell 12 (i.e., the third-stage vertical ribs 115C may be omitted).

Further, while the battery device 1C of the above-described fourth embodiment is configured based on the battery device 1 of the above-described first embodiment which takes measures for the load inputted from the vehicle forward side, the structure in which the thickness of the vertical rib is changeable according to the position of the battery cell like the fourth embodiment is applicable to the battery device 1A of the second embodiment which takes measures for the load inputted from the vehicle rearward side (FIG. 12) or the battery device 1B of the third embodiment which takes measures for the load inputted from the outward side of the vehicle (FIG. 13).

(5) Other Embodiments

While the concave groove 27 is formed only at the front face 25a of the cell case 25 of the battery cell 12 in the first embodiment, this concave groove may be formed at both the front face 25a and the rear face 25b of the cell case 25.

Figure 15:
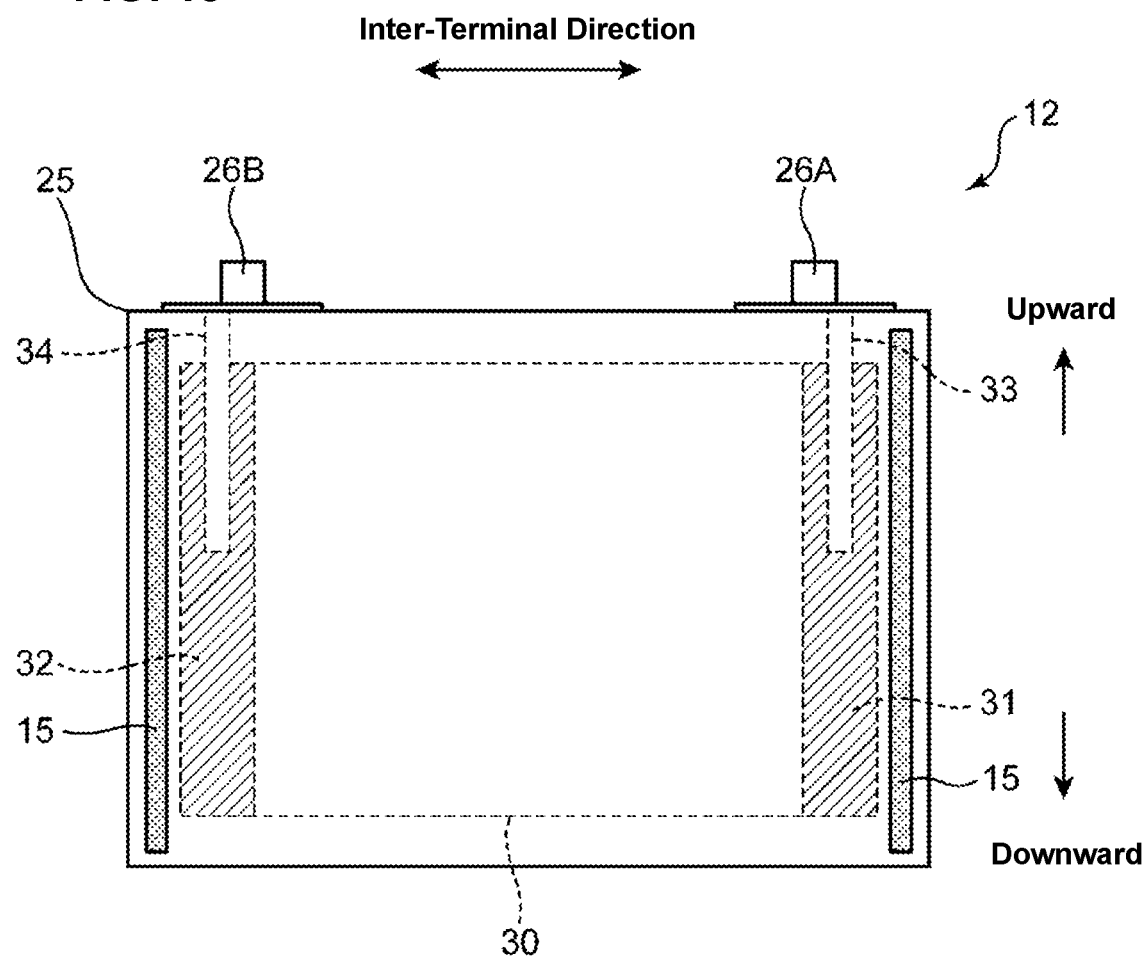
FIG. 15 is a back view, corresponding to FIG. 8, for explaining a modification of the first embodiment.

While the two vertical ribs 15 are provided at each of the battery cells 12 and the pair of vertical ribs 15 are provided to be offset from the pair of collectors 33, 34 toward the central side, in the inter-terminal direction (inwardly), of the battery cell 12 in the first embodiment, these two vertical ribs 15 may be provided to be offset from the pair of collectors 33, 34 outwardly as shown in FIG. 15, for example, as long as the vertical ribs 15 are located at positions which are spaced apart from the center, in the inter-terminal direction, of the battery cell 12 such that these ribs 15 do not overlap with the collectors 33, 34.

While the two vertical ribs 15 (gap-forming portion) which are of the bar shape and extend in the vertical direction are provided at each of the battery cells 12 in the first embodiment, the shape or arrangement position of the gap-forming portions are properly changeable as long as the two gap-forming portions of the present invention are provided at the battery cell such that these gap-forming portions are spaced apart from each other in the inter-terminal direction.

Figure 16A:
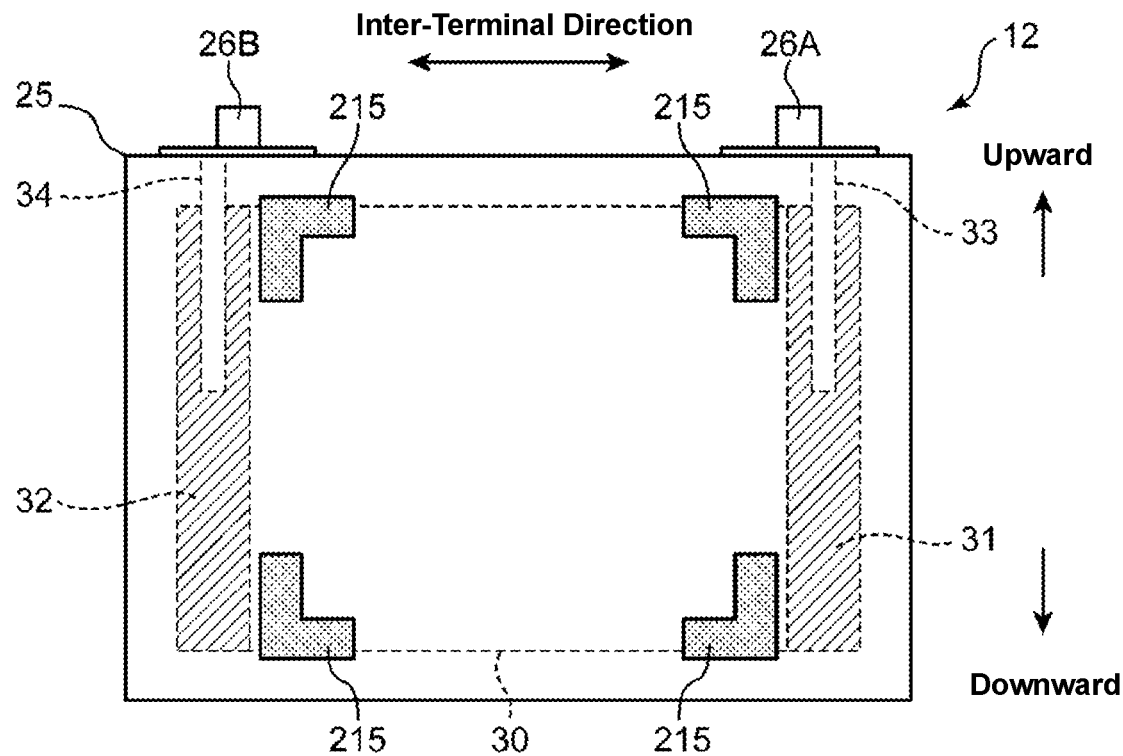
FIGS. 16A and 16B are back views, corresponding to FIG. 8, for explaining other modifications of the first embodiment.
Figure 16B:
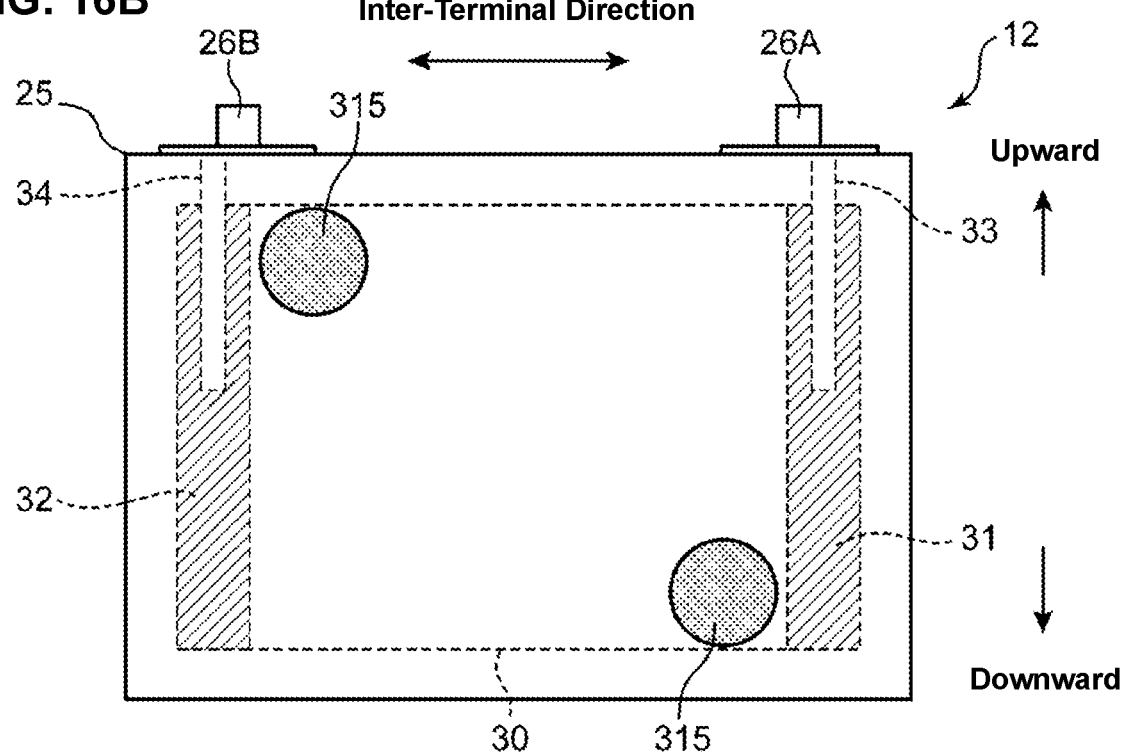

For example, as shown in FIG. 16A, four L-shaped members 215 which are spaced apart from each other both in the vertical direction and in the inter-terminal direction may be provided as the gap-forming portions. Further, as shown in FIG. 16B, two circular members 315 which are spaced apart from each other in the vertical direction and in the inter-terminal direction may be provided as the gap-forming portions.

While various modifications based on the first embodiment have been described, these modifications are applicable to the other embodiment (the second-fourth embodiments) as well.

What is claimed is:

1. A lithium-ion battery device for a vehicle, comprising:
a housing;
a battery cell stored inside the housing; and
an adjacent member provided adjacently to and on a rearward side, in a vehicle longitudinal direction, of the battery cell,
wherein said battery cell comprises a cell case, an electrode body stored inside the cell case, a pair of terminals provided at a face of the cell case, and a pair of collectors connecting said electrode body and said pair of terminals inside said cell case,
said cell case includes a first main face and a second main face which respectively have a larger area than said face at which the pair of terminals are provided and face to each other in the vehicle longitudinal direction,
said second main face is arranged on the rearward side, in the vehicle longitudinal direction, of said battery cell,
two gap-forming portions which respectively have a smaller area than said second main face and have a specified thickness in the vehicle longitudinal direction are arranged between said second main face and said adjacent member,
said two gap-forming portions are spaced apart from each other at a distance greater than the specified thickness in an inter-terminal direction of said battery cell without any other gap-forming portions between them, to form a space to allow bending deformation of the cell case,
the pair of collectors are respectively joined to opposite end portions of the electrode body, in the inter-terminal direction, of the battery cell,
each of the two gap-forming portions is offset from the pair of collectors toward a central portion, in the inter-terminal direction, of the battery cell,
each of the two gap-forming portions overlap the electrode body when viewed from the vehicle longitudinal direction,
a width ratio Lr/Lc between the two gap-forming portions is 0.68 or greater, where Lc is a distance between opposite ends of the of the cell case in the inter-terminal direction of the battery cell, and Lr is a distance between the respective centers of the two gap-forming portions in the inter-terminal direction of the battery cell,
said electrode body comprises a pair of foil bodies disposed at opposite end portions of the electrode body in the inter-terminal direction of the battery cell,
the pair of collectors are respectively joined to the pair of foil bodies, and
each of the two gap-forming portions is offset from the pair of foil bodies and the pair of collectors toward the central portion, in the inter-terminal direction, of the battery cell such that each of the two gap-forming portions is spaced from the pair of foil bodies in the inter-terminal direction of the battery cell.

2. The lithium-ion battery device for the vehicle of claim 1, wherein said first main face of the cell case has a concave groove which is positioned between said two gap-forming portions and extends in a direction perpendicular to said inter-terminal direction of the battery cell.

3. The lithium-ion battery device for the vehicle of claim 2, further comprising an additional battery cell provided on the rearward side, in the vehicle longitudinal direction, of said battery cell, and an additional adjacent member provided adjacently to and on a rearward side, in the vehicle longitudinal direction, of said additional battery cell, wherein an additional gap-forming portion which has a smaller thickness in the vehicle longitudinal direction than said two gap-forming portions is provided between said additional battery cell and said additional adjacent member.

4. The lithium-ion battery device for the vehicle of claim 1, further comprising an additional battery cell provided on the rearward side, in the vehicle longitudinal direction, of said battery cell, and an additional adjacent member provided adjacently to and on a rearward side, in the vehicle longitudinal direction, of said additional battery cell, wherein an additional gap-forming portion which has a smaller thickness in the vehicle longitudinal direction than said two gap-forming portions is provided between said additional battery cell and said additional adjacent member.

* * * * *